April 10, 1962
R. A. KAPLAN ETAL
3,028,723
METHOD AND APPARATUS FOR ASSEMBLING AND DISASSEMBLING
THE CHAINS OF CRAWLER-TYPE TRACTORS
Filed March 24, 1958
15 Sheets-Sheet 1
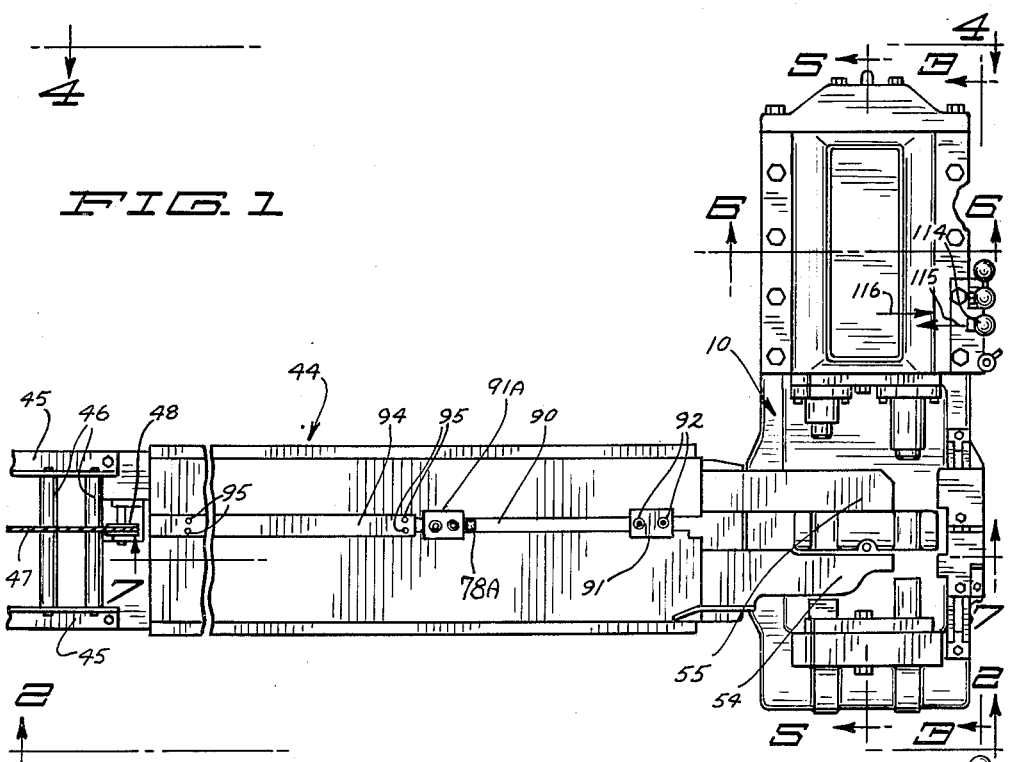
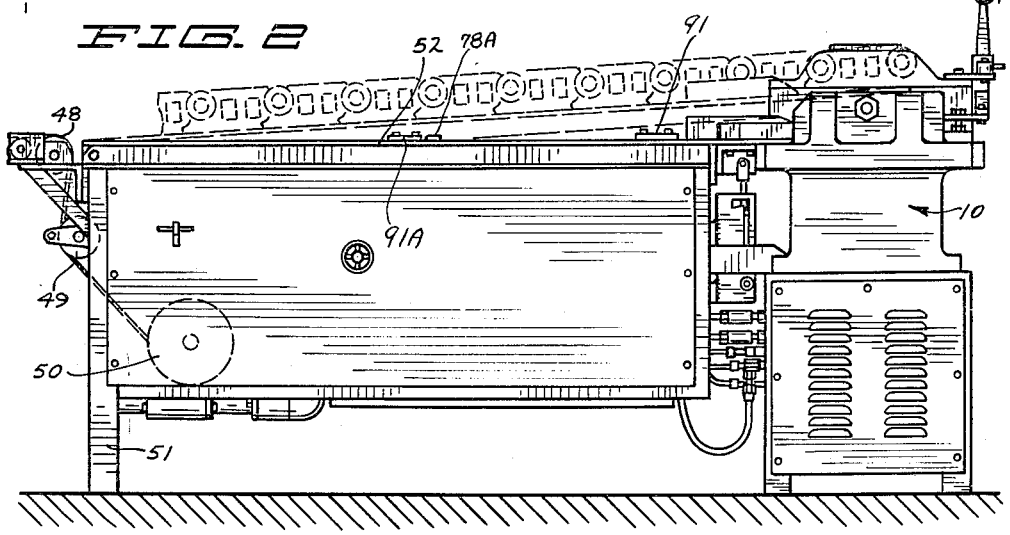
INVENTORS
REUBEN A. KAPLAN
DONALD J. KAPLAN
FRED C. GRABOW
BY: Ralph L. Dugger
ATTORNEY

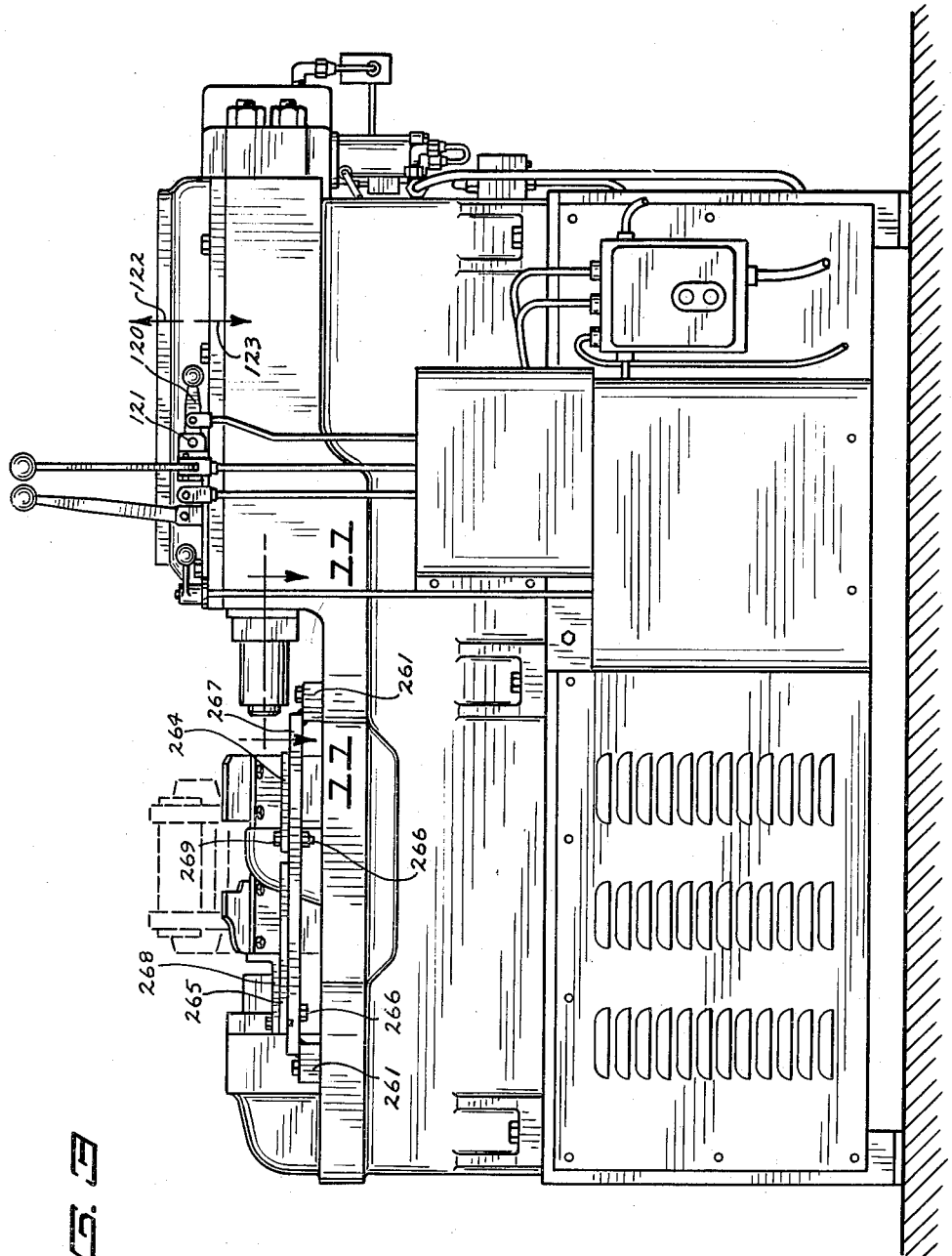

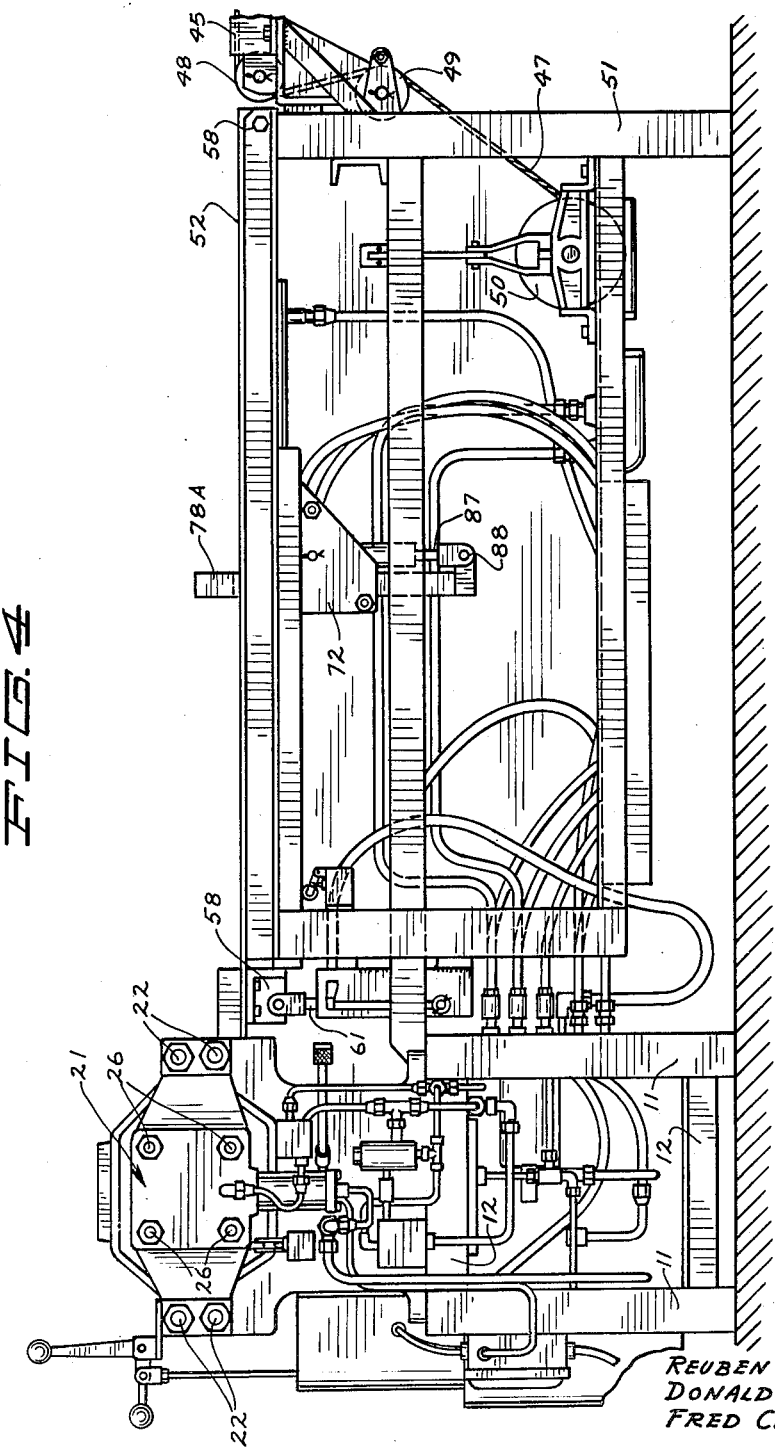

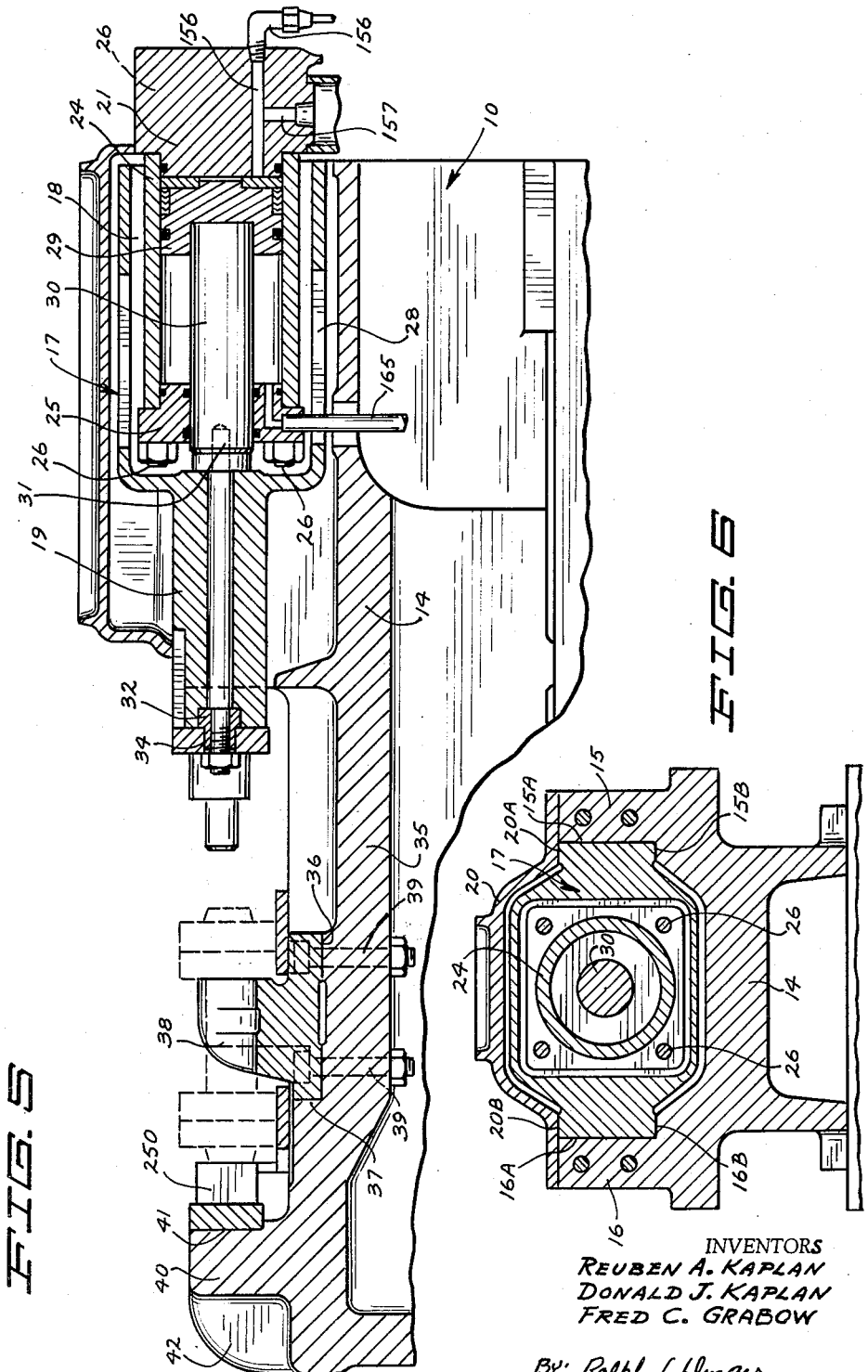

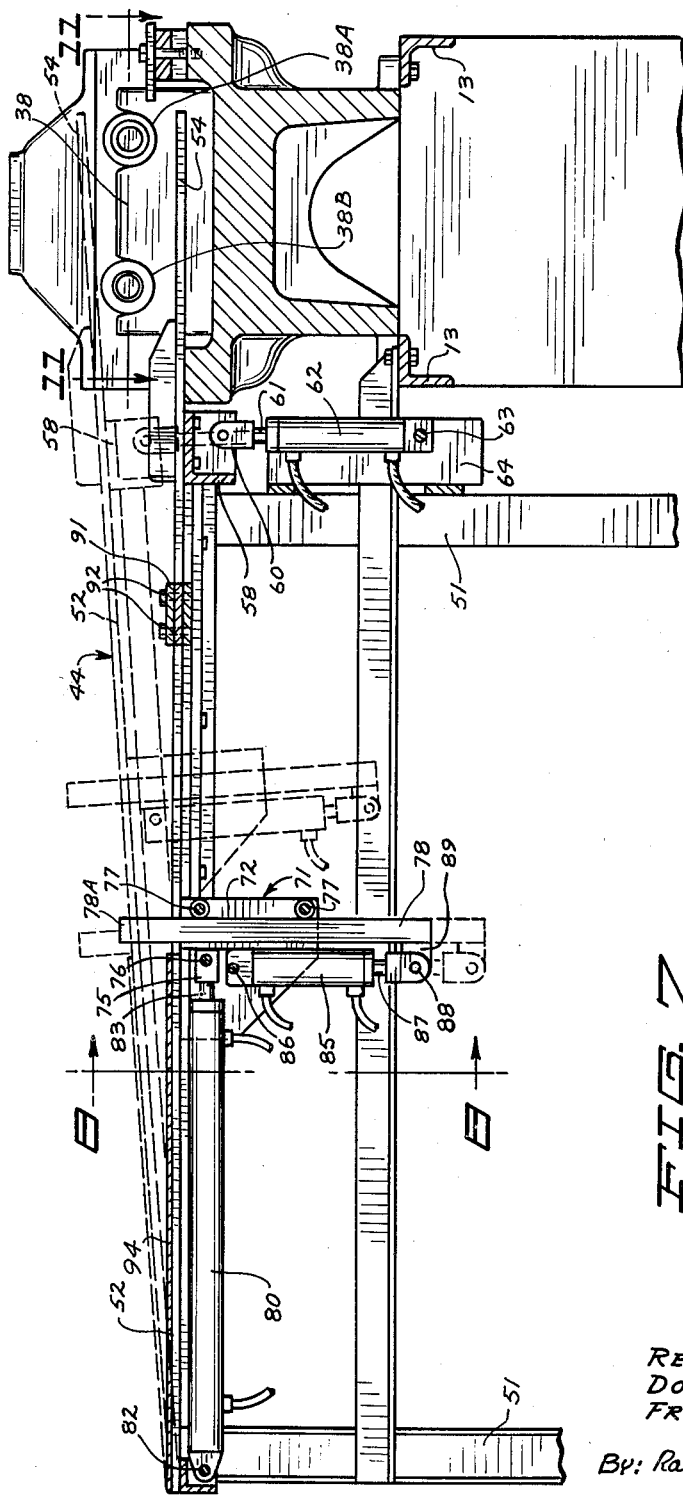

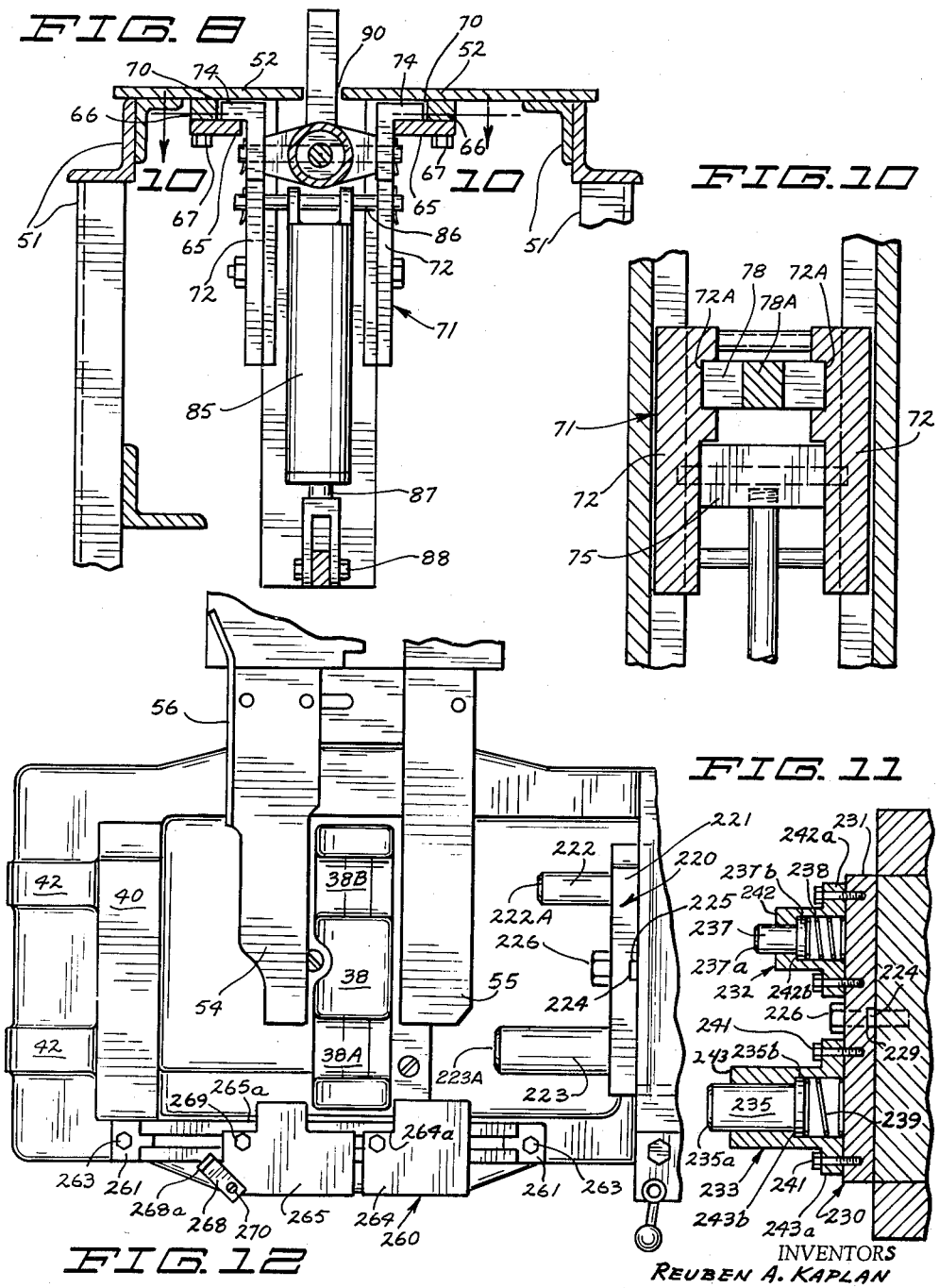

April 10, 1962
R. A. KAPLAN ETAL
3,028,723
METHOD AND APPARATUS FOR ASSEMBLING AND DISASSEMBLING
THE CHAINS OF CRAWLER-TYPE TRACTORS
Filed March 24, 1958
15 Sheets-Sheet 7
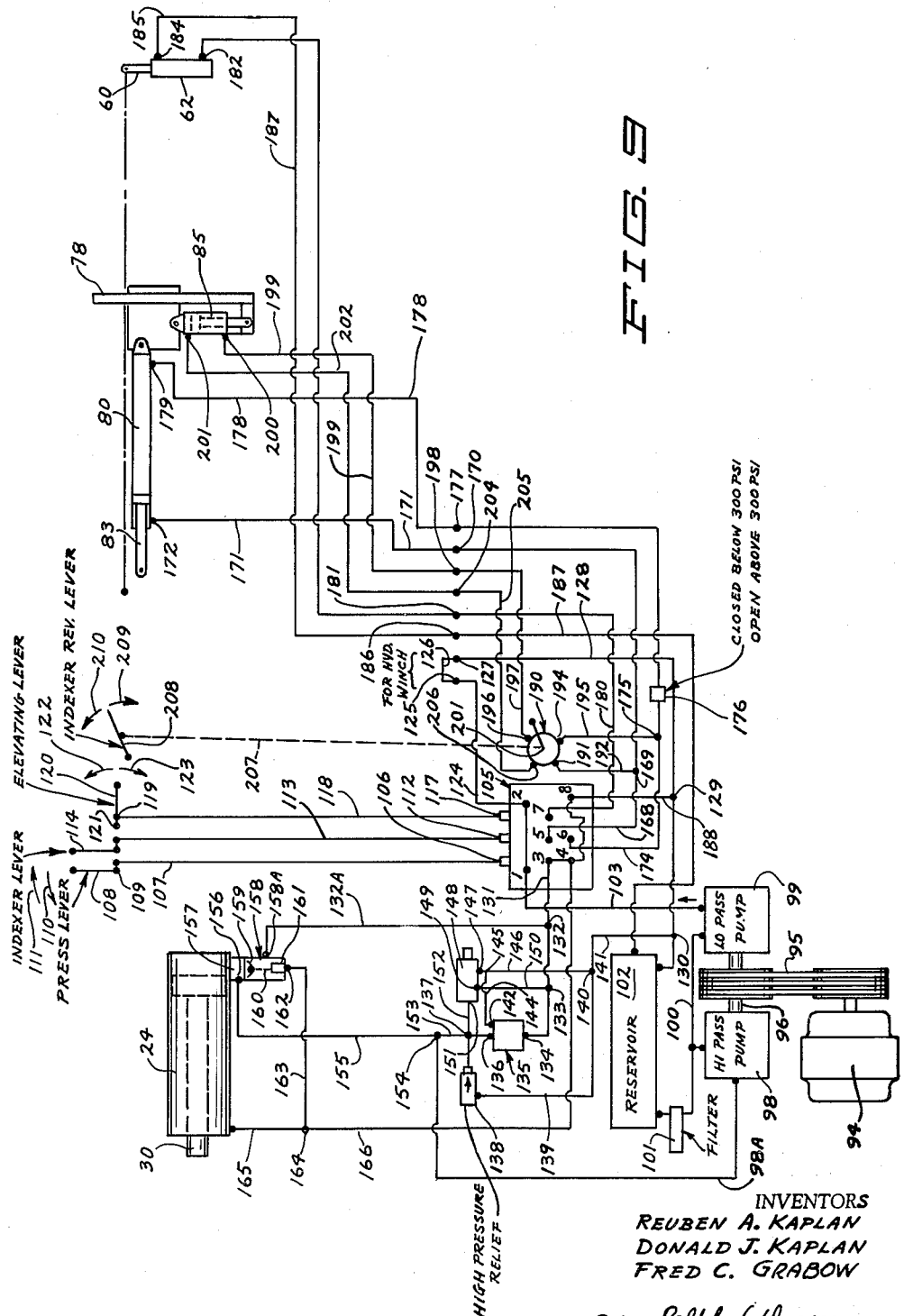
INVENTORS
REUBEN A. KAPLAN
DONALD J. KAPLAN
FRED C. GRABOW
BY: Ralph L. Dugger
ATTORNEY April 10, 1962   R. A. KAPLAN ETAL   3,028,723
METHOD AND APPARATUS FOR ASSEMBLING AND DISASSEMBLING
THE CHAINS OF CRAWLER-TYPE TRACTORS
Filed March 24, 1958   15 Sheets-Sheet 8
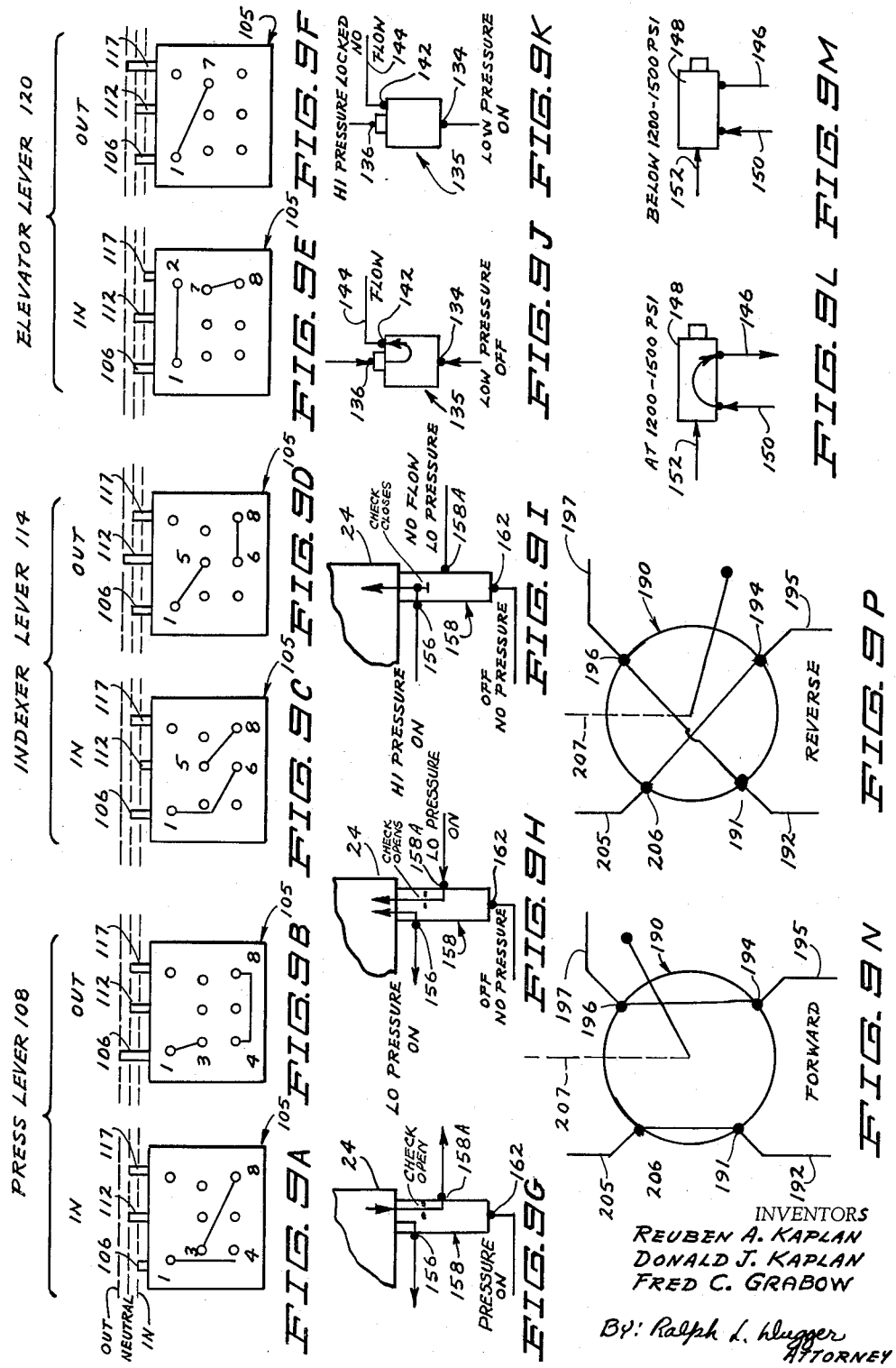
INVENTORS
REUBEN A. KAPLAN
DONALD J. KAPLAN
FRED C. GRABOW
BY: Ralph L. Wugger
ATTORNEY

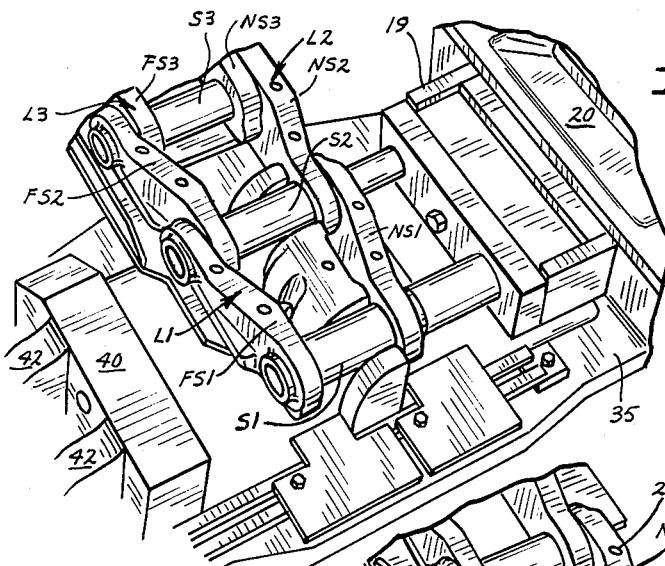
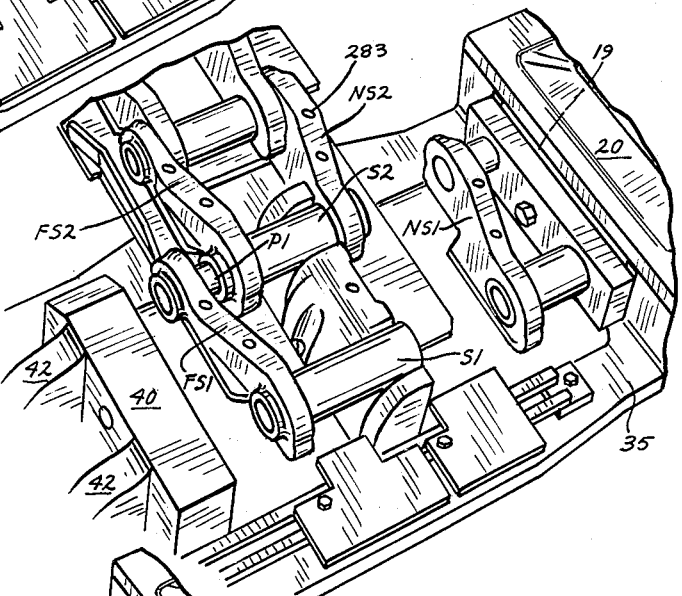
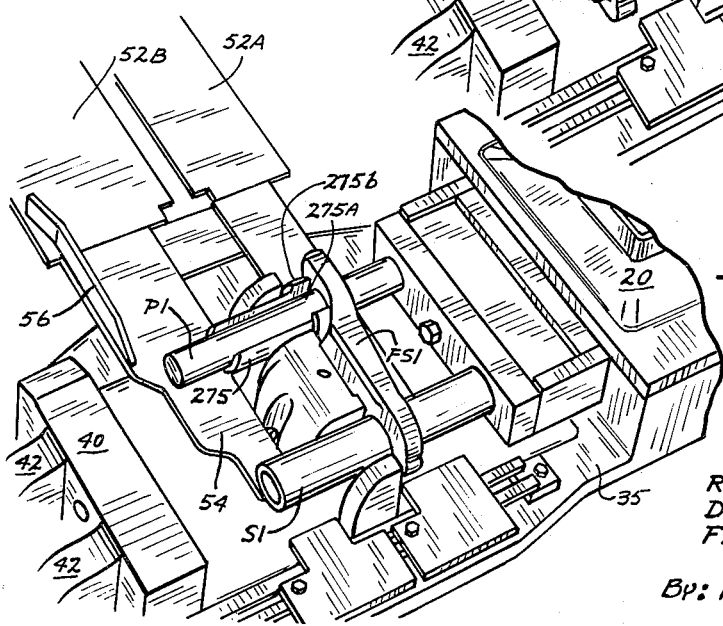

INVENTORS
REUBEN A. KAPLAN
DONALD J. KAPLAN
FRED C. GRABOW

By: Ralph L. Dugger
ATTORNEY

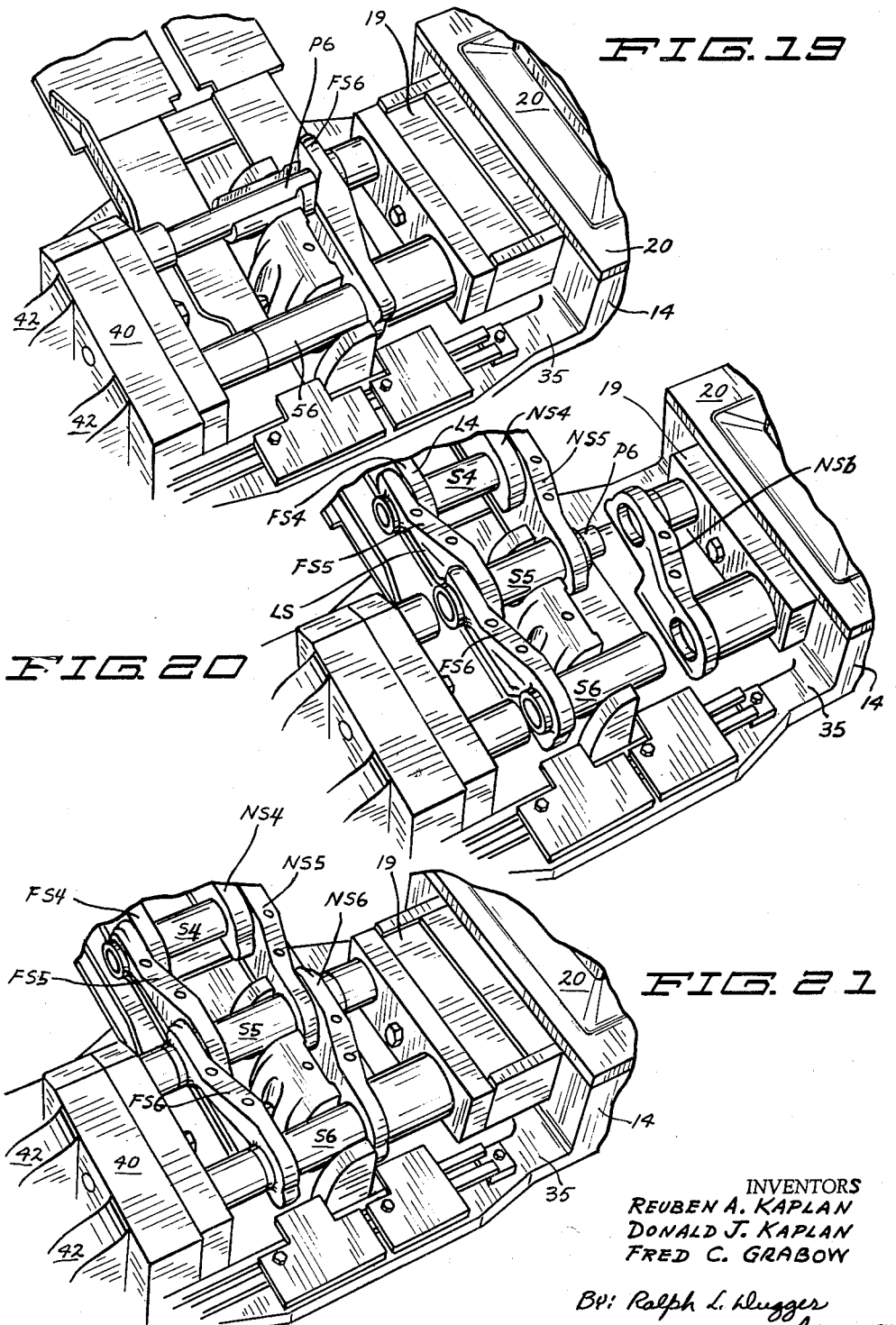

April 10, 1962 R. A. KAPLAN ETAL 3,028,723
METHOD AND APPARATUS FOR ASSEMBLING AND DISASSEMBLING
THE CHAINS OF CRAWLER-TYPE TRACTORS
Filed March 24, 1958 15 Sheets-Sheet 12
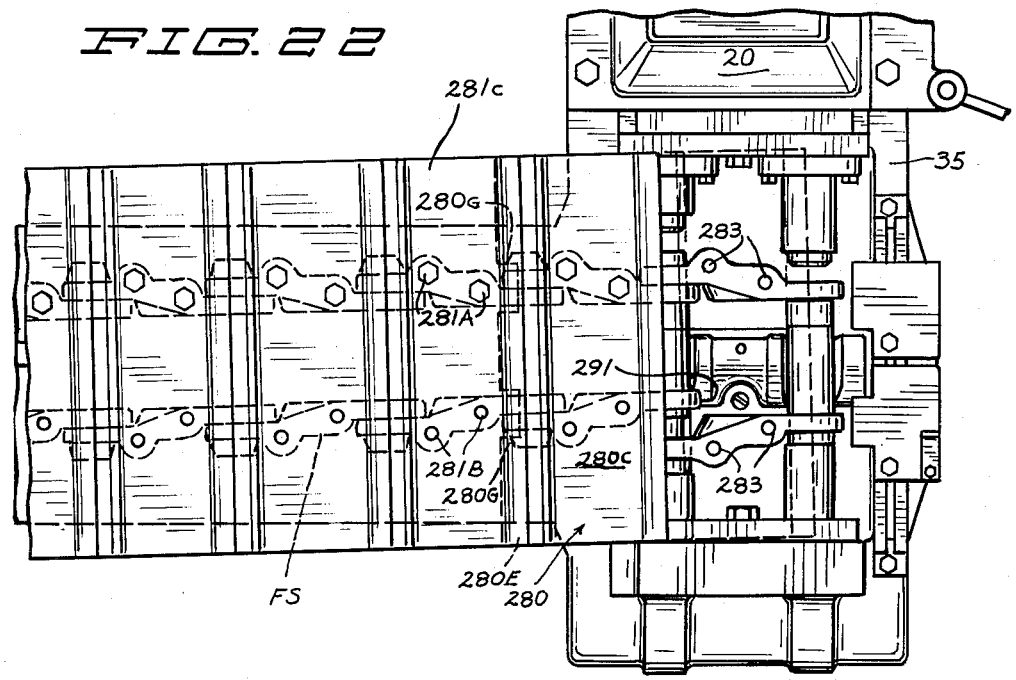
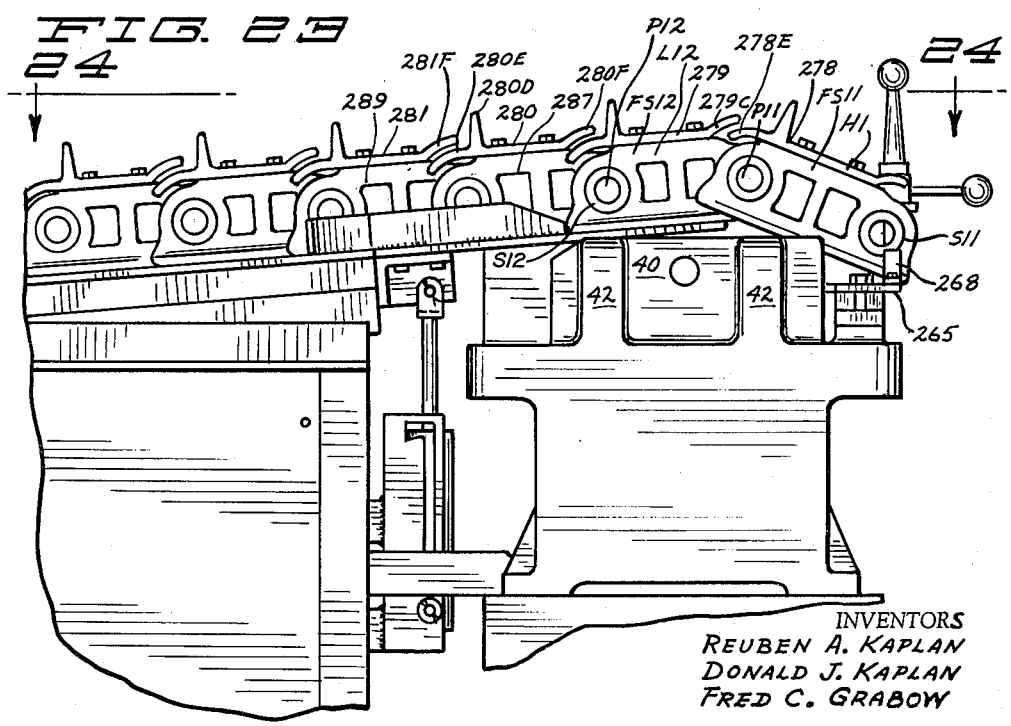
INVENTORS
REUBEN A. KAPLAN
DONALD J. KAPLAN
FRED C. GRABOW
BY: Ralph L. Dugger
ATTORNEY April 10, 1962 R. A. KAPLAN ETAL 3,028,723
METHOD AND APPARATUS FOR ASSEMBLING AND DISASSEMBLING
THE CHAINS OF CRAWLER-TYPE TRACTORS
Filed March 24, 1958 15 Sheets-Sheet 13

INVENTORS
REUBEN A. KAPLAN
DONALD J. KAPLAN
FRED C. GRABOW
By: Ralph L. Dugger
ATTORNEY April 10, 1962    R. A. KAPLAN ETAL    3,028,723
METHOD AND APPARATUS FOR ASSEMBLING AND DISASSEMBLING
THE CHAINS OF CRAWLER-TYPE TRACTORS
Filed March 24, 1958    15 Sheets-Sheet 14
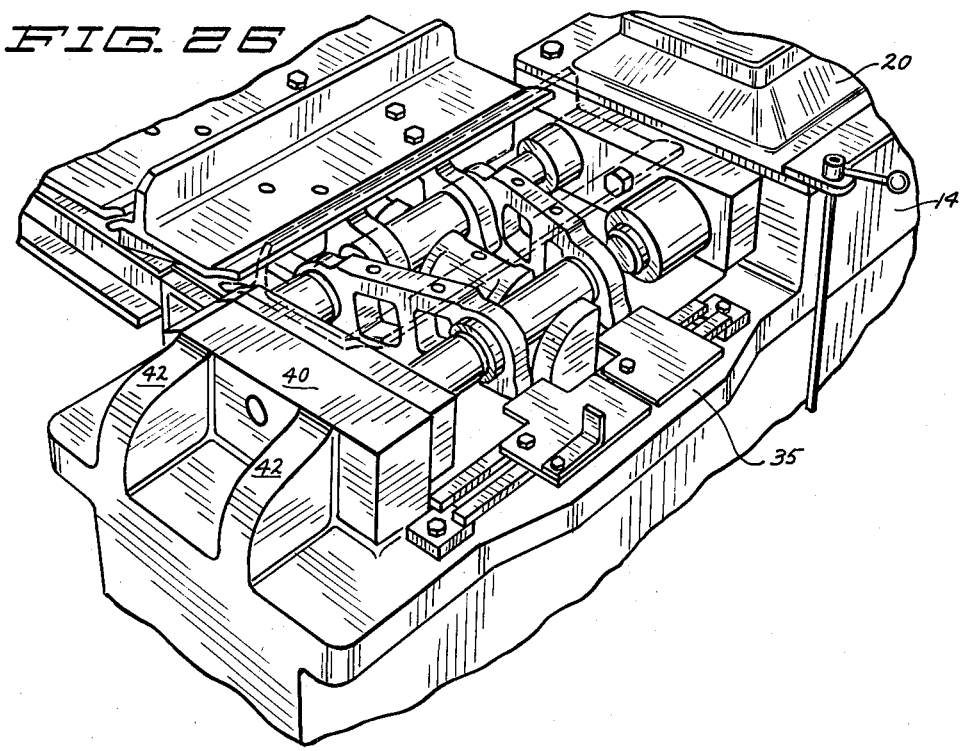
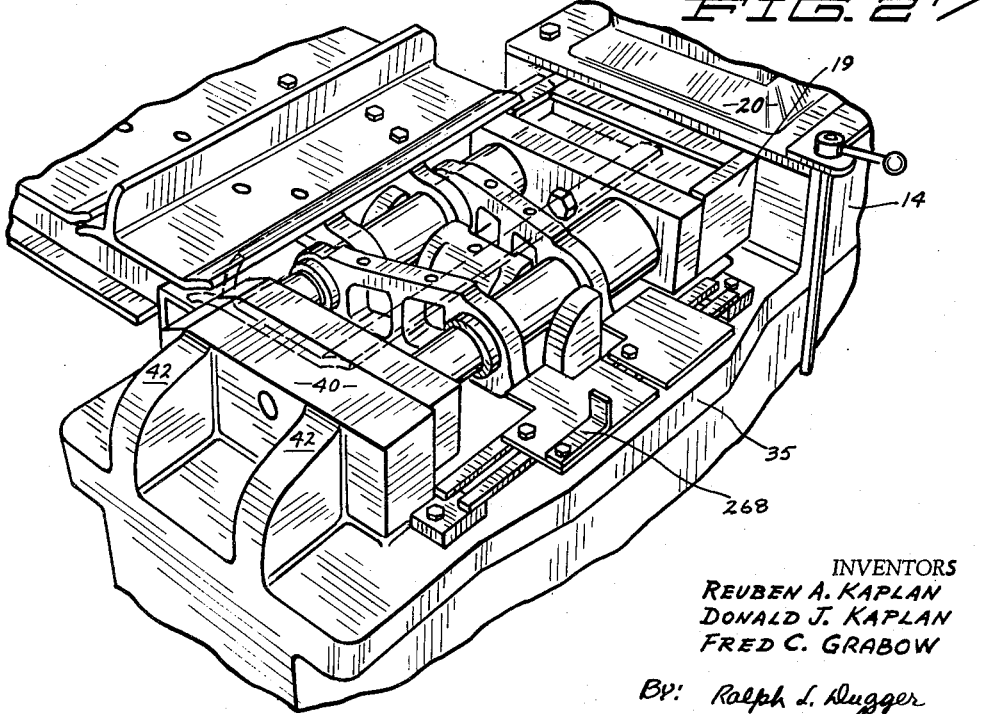
INVENTORS
REUBEN A. KAPLAN
DONALD J. KAPLAN
FRED C. GRABOW
By: Ralph L. Dugger
ATTORNEY

INVENTORS
REUBEN A. KAPLAN
DONALD J. KAPLAN
FRED C. GRABOW

By: Ralph L. Dugger
ATTORNEY

United States Patent Office 3,028,723
Patented Apr. 10, 1962

3,028,723
METHOD AND APPARATUS FOR ASSEMBLING AND DISASSEMBLING THE CHAINS OF CRAWLER-TYPE TRACTORS
Reuben A. Kaplan, Donald J. Kaplan, and Fred C. Grabow, Owatonna, Minn., assignors to Owatonna Tool Company, Owatonna, Minn., a corporation of Minnesota
Filed Mar. 24, 1958, Ser. No. 723,427
10 Claims. (Cl. 59—7)

This invention relates to method and apparatus for assembling and disassembling the chains of crawler-type tractors. In the crawler-type tractor there are customarily provided two crawler "tracks," one on each side of the vehicle, which are so arranged that they form a roadbed of steel, on which the wheels of the tractor progress. The chain is composed of links, each link being composed of two side pieces, a sleeve and a pin. The side pieces are associated such that they converge at one end, and at this end they are connected together by a tubular member or "sleeve" which is pressed into accurately formed holes in the side links. The other ends of the side links diverge sufficiently so that when assembled they will rest against the other faces of the converged end of the next link. A pin is pressed into these side links, the pin extending through the sleeve of the next "link" in the chain. Usually the sleeves, in the assembled condition, project outwardly a short distance beyond the outer faces of the side links, and form a hub about which the side faces of the next "link" in the chain pivot.

The side faces of the links in the chain are provided with drill holes and at these places there are bolted plates, which extend across the side links and form the ground invading surface. These plates are known as "grousers" and they are usually of specially rolled stock providing a rib which engages the ground transversely in the direction of motion. They are also shaped so that one grouser on one "link" in the chain overlaps the adjacent edge of the grouser on the next link in the chain, the adjacent edges of the grousers being so shaped that when the chain is flexed around the wheels of the vehicle, the amount of overlapping will change but will not present any spaces of appreciable area between the grousers.

The current chains of crawler-type tractors are operated under the worst possible conditions so far as service life is concerned. They are subjected constantly to the weather, they are operated in a completely unlubricated condition, they are subjected to tremendous abrasive forces, they are subjected to exceedingly great turning movements, heavy weight, and strains in every imaginable direction. It is therefore not unexpected that the current chains of crawler-type tractors must frequently be serviced.

In service, the pin of one link trunnions in the sleeve of the next link and the projecting ends of the sleeves trunnion in appropriately formed recesses on the inner faces of the side pieces of the links. Also in service, the teeth on the wheels of the tractor are in the form of sprocket teeth and these teeth bear against the exterior surfaces of the sleeve. With all this, the current chains are subjected to the corrosive influences due to constant exposure. Therefore, after a period of wear, the sleeves, where engaged by the teeth of the sprocket wheels, will be found to be worn and out of round. Likewise, where the pins of one link trunnion in the sleeve of the next link, wear occurs upon both the pin and the sleeve causing sharp indentation particularly at the "corner" where the pin emerges from the sleeve.

Portions of the pins and sleeves which are not abraded free from rust and corrosion during operation, will accumulate rust and corrosion thereon.

Heretofore, it has usually been customary to disassemble crawler-type tractor chains by first removing the grousers which is sometimes a difficult and time-consuming operation. Then by means of a hydraulic press, the pin is pushed entirely through the side piece on the far side. A similar push against the sleeve will push it entirely through the side piece on the far side of the link. When this is done, the link parts (two side pieces, a pin, and a sleeve) are completely disassembled. Assembly is by a reversed procedure of this process. Such disassembly operation is unsatisfactory because it takes a long ram in order to push the pin and the sleeve out, and also because of a broaching and scarring action caused by the passage through the far side piece, of those portions of the pin or sleeve which have been between the side pieces, while the chain is assembled. The condition of being out of round, or worn, greatly increases this broaching action, and as a consequence the holes in the side pieces are enlarged so that replacement parts do not fit tightly. Furthermore, the use of a long ram, or bar with a ram, has occasionally caused accidents because even slight misalignment, under the heavy pressing used, may push the pusher bar sideways and cause accidents.

It is an object of the present invention to provide a method and apparatus for the assembly and disassembly of crawler-type tractor chains wherein the pins and sleeves, during disassembly, are always pushed from the outside toward the inside face of the side pieces, thereby never involving any condition in which either a pin or a sleeve is pushed throughout its entire length through one of the side pieces. It is a further object of the invention to provide an improved method and apparatus wherein the pin and sleeve of a link are simultaneously pushed out of one side piece, and then the same pin and sleeve are simultaneously pushed out of the other side piece for complete disassembly, the direction of pushing being always from the outer face of the side piece toward the inner face.

It is another object of the invention to provide an improved method and apparatus wherein reassembly of the chains may be accomplished in a series of steps wherein a side piece is simultaneously assembled by pushing on its outer face to move the side piece simultaneously on the ends of a pin and sleeve, and the link then further assembled by simultaneously pushing against the outer face of the companion side piece, to complete assembly of the chain links.

It is a further object of the invention to provide a method and apparatus wherein crawler-type tractor chains may be disassembled and reassembled while the grouser plates are all attached to the side pieces forming the links along one side of the chain, said grouser plates being detached only from the side pieces on the other side of the links in the chain. Other objects are those, inherent in the apparatus and methods herein illustrated, described, and claimed.

To the accomplishment of the foregoing and related ends, this invention then comprises the features hereinafter fully described and specifically pointed out in the claims, the following description setting forth in detail certain embodiments of the invention, these being indicative however, of but a few of the various ways in which the principles of the invention may be employed. This invention is illustrated in the drawings in which the same numerals refer to corresponding parts and in which:

FIGURE 1 is a plane view of one exemplary form of apparatus of the invention.

FIGURE 2 is a side elevational view taken in the direction of arrows 2—2 of FIGURE 1.

FIGURE 3 is a front elevational view taken in the direction of arrows 3—3 of FIGURE 1.

FIGURE 4 is a side elevational view in the direction of arrows 4—4 of FIGURE 1, showing the apparatus with cover plates removed, so as to expose the interior thereof.

FIGURE 5 is a fragmentary enlarged vertical sectional view taken along the line and in the direction of arrows 5—5 of FIGURE 1.

FIGURE 6 is an enlarged transverse sectional view of the hydraulic cylinder and crossed portions of the apparatus, taken along the line and in the direction of arrows 6—6 of FIGURE 1.

FIGURE 7 is a longitudinal sectional view taken along the line and in the direction of arrows 7—7 of FIGURE 1.

FIGURE 8 is an enlarged fragmentary transverse sectional view through the conveyor track, illustrating a portion of the indexing mechanism, this view being taken along the line and in the direction of arrows 8—8 of FIGURE 7.

FIGURE 9 is a schematic diagram showing the various hydraulic cylinders, valves, hydraulic supply and controls of the apparatus and shows the main control valve conditions when the press, indexer, and elevating levers are in neutral positions.

FIGURES 9a and 9b diagrammatically illustrate the two operating conditions of the main control valve when the press lever is moved from a neutral position.

FIGURES 9c and 9d diagrammatically illustrate the two operating conditions of the main control valve when the indexer lever is moved from a neutral position.

FIGURES 9e and 9f diagrammatically illustrate the two operating conditions of the main control valve when the elevator lever is moved from a neutral position.

FIGURES 9g, 9h, and 9i diagrammatically illustrate the three operating conditions of the pilot operated check valve and the flow of high and low pressure oil therethrough.

FIGURES 9j and 9k diagrammatically illustrate the operating conditions of the high pressure unloading valve.

FIGURES 9l and 9m diagrammatically illustrate the two operating conditions of the low pressure unloading valve.

FIGURES 9n and 9p illustrate the two operating conditions of the reversing valve 190.

FIGURE 10 is a fragmentary horizontal sectional view through a portion of the indexing mechanism, this figure being taken along the lines and in the direction of arrows 10—10 of FIGURE 8.

FIGURE 11 is a fragmentary horizontal sectional view taken along the line and in the direction of arrows 11—11 of FIGURES 3 and 7, illustrating the equipment that is attached to the ram head during the disassembling operation.

Figure 16:
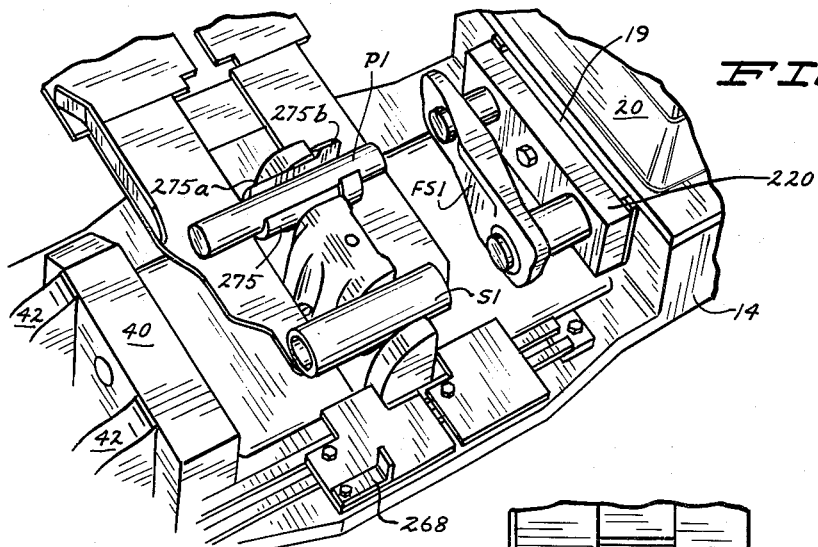

FIGURE 12 and FIGURES 13, 14, 15, and 16, illustrate the press as it is equipped and operated during the disassembling operation, FIGURE 12 being a fragmentary horizontal view of the work area of the press, and a portion of the presser head, equipped for the disassembling operation. FIGURES 13, 14, 15, and 16, are all isometric views looking down and from an angle. In FIGURE 13 the ram head is about to be operated at the beginning of its stroke for simultaneously pressing out the pin and sleeve from the adjacent side piece of the link. In FIGURE 14, the ram head which has been retracted carries with it the adjacent side piece of the link; the sub-assembly of sleeves, pins, and the other side piece of the link being displaced from the remainder of the chain. FIGURE 15 shows a sub-assembly reversed in position to have the pin and sleeve pushed out whereas FIGURE 16 shows the ram retracted and carrying with it the detached side piece of the link, freed from the pin and the sleeve.

Figure 17:
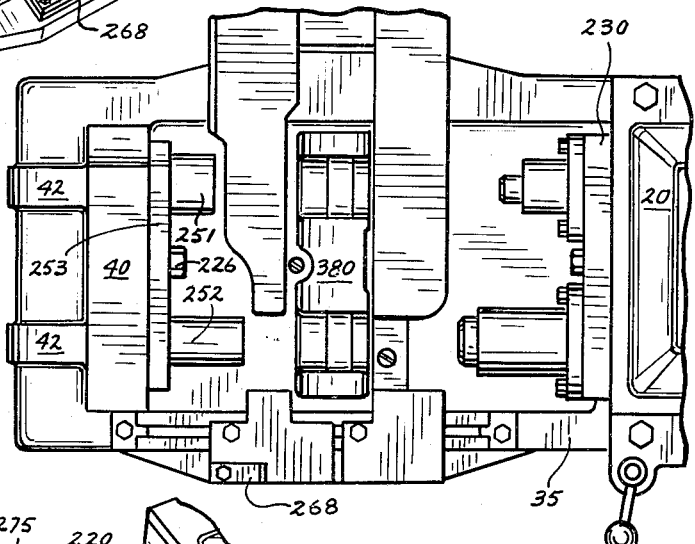
Figure 18:
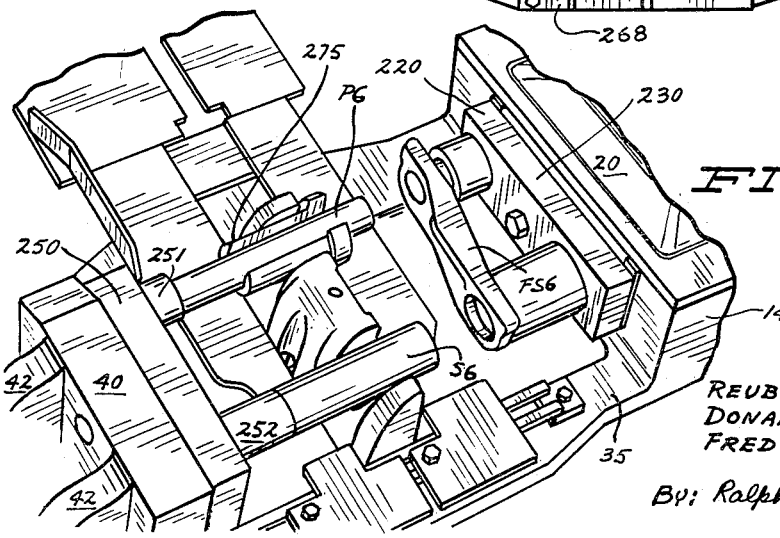

FIGURES 17, 18, 19, 20, and 21 are a group of related views illustrating the assembly of a chain, FIGURE 17 being a plan view of the work area of the press, similar to FIGURE 12. The presser head being equipped as shown in FIGURE 11 for the assembling operation, and the back stop of the press being likewise so equipped for the assembling operation. FIGURES 18 through 21 are related isometric views similar to those in FIGURES 13 through 16, except that they illustrate the assembly operation. FIGURE 18 shows the ram about to be actuated for assembling a side piece on the pin and sleeves, FIGURE 19 illustrating the next phase which is assembing the side piece on the sleeve and pin. FIGURE 20 shows the final stage of assembly of the chain wherein the sub-assembly of side piece, pin, and sleeve are about to be completed to form a link by the pressing on an additional side piece. FIGURE 20 shows the ram about to be actuated. FIGURE 21 shows the link assembly after the ram has been actuated.

Figure 24:
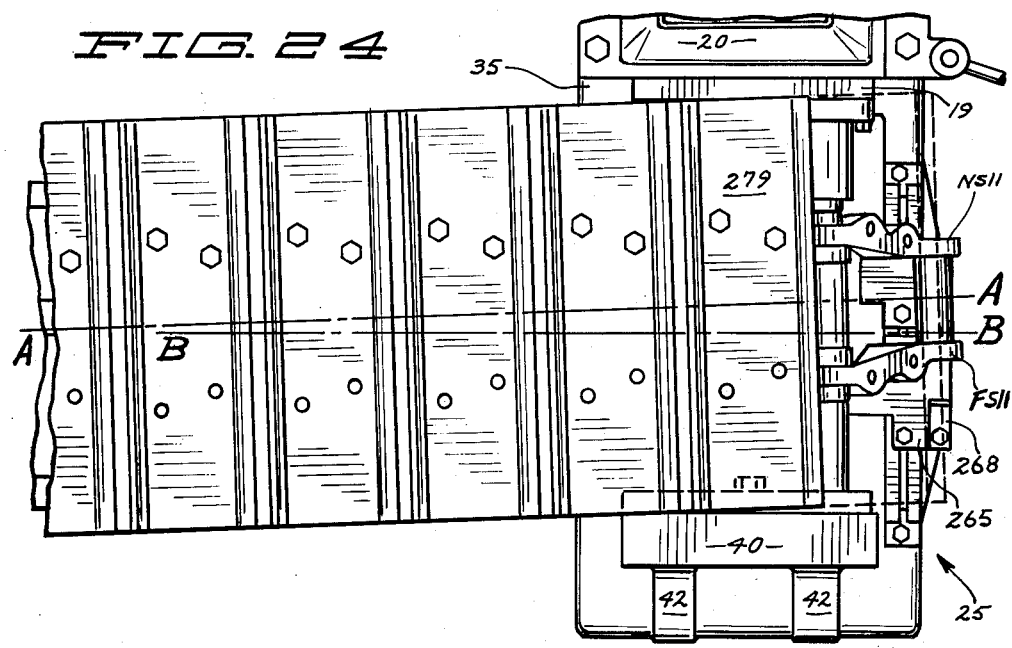
Figure 25:
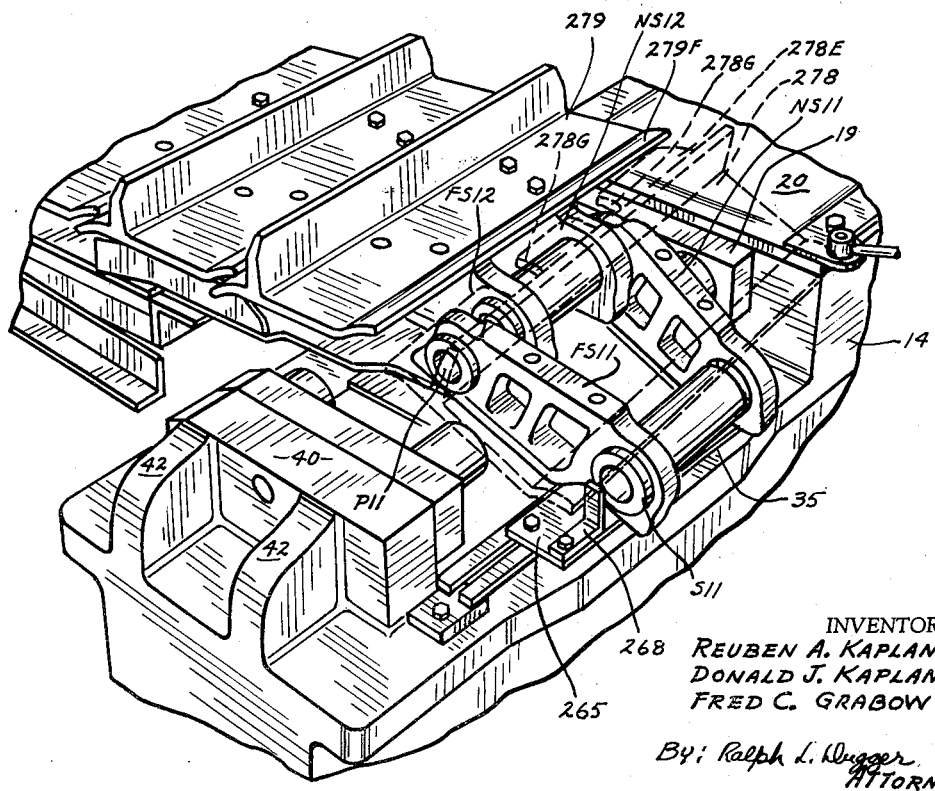

FIGURES 22 through 27 illustrate various steps in the method and exemplary apparatus for assembling the chain with the grousers attached to the side pieces along one side of the links. FIGURE 22 is a fragmentary plan view of the work area of the press and an adjacent portion of the conveyor mechanism. FIGURE 23 is a fragmentary side elevational view showing the conveyor mechanism in an elevated condition. FIGURE 24 is a plan view corresponding to FIGURE 22 but illustrating the press and a section of the track as shown in FIGURE 23, the FIGURE 24 being taken in the direction of arrows 24—24 of FIGURE 23. FIGURE 25 is a fragmentary isometric view of the apparatus as shown in FIGURE 24 with the end grouser on the lead link shown in phantom condition. FIGURES 26 and 27 are fragmentary isometric views corresponding to FIGURE 25, with the end grouser in phantom condition, and FIGURE 26 illustrating the beginning of a pressing stroke wherein a link is assembled and FIGURE 27 the end of the same stroke.

Figure 28:
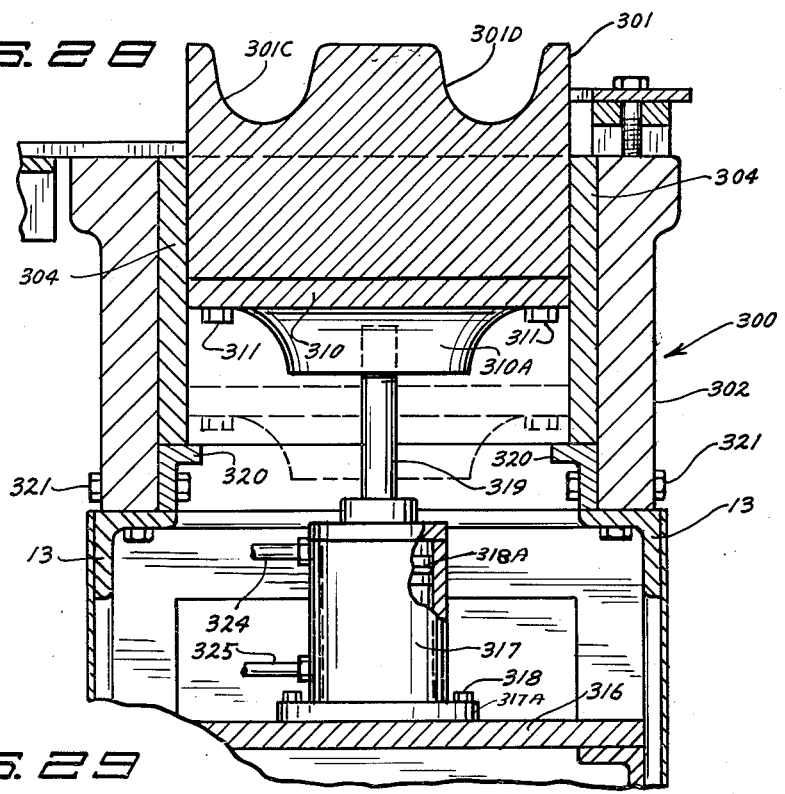

FIGURE 28 is a fragmentary vertical sectional view similar to the portion view shown in FIGURE 7, illustrating a modified embodiment of this invention wherein the anvil is mounted for vertical movement in the main casting, said anvil being shown in an elevated position.

Figure 29:
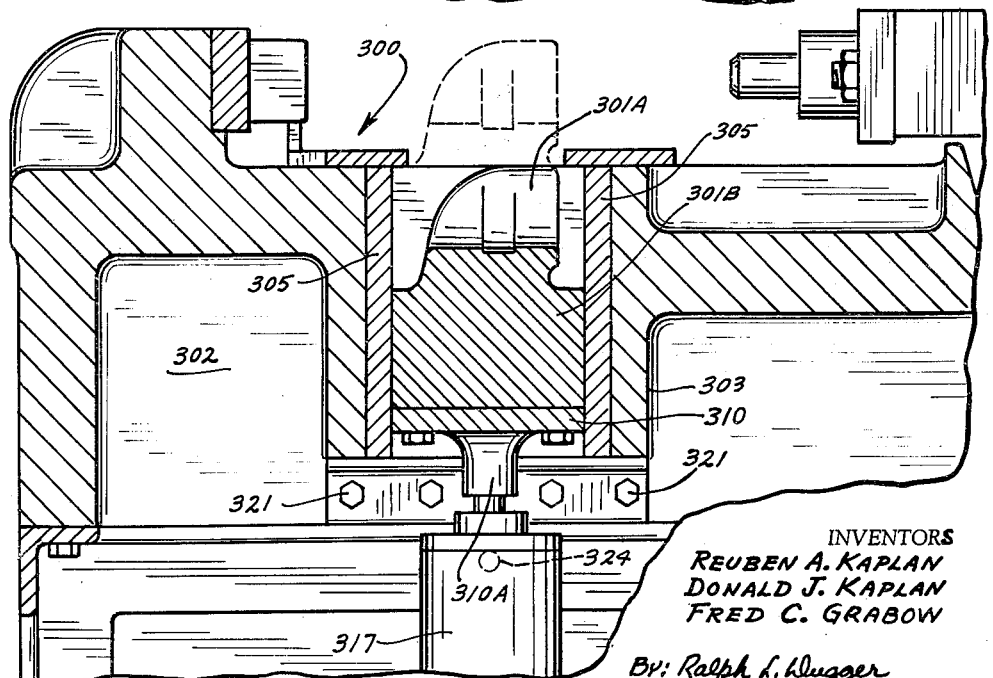

FIGURE 29 is a fragmentary vertical sectional view similar to that shown in FIGURE 5 showing the modified embodiment of this invention of FIGURE 28 wherein the anvil is mounted for vertical movement in the main casting, said anvil being shown in a retracted position.

Referring to the drawings, and particularly to FIGURES 1-8 and 10, the exemplary form of the present mechanism of the invention therein illustrated comprises a main base casting framework generally designated 10, which is supported at convenient work level by a subframe comprising angularly end links 11—11, cross-frame members 12—12, and stringer 13—13. The main frame casting 10 is set into the sub-frame and fastened thereto by bolts appropriately spaced. Referring to FIGURES 5 and 6, particularly, the main frame casting has a central body portion 14 and upstanding side flanges 15 and 16 which are machined so as to present finished surfaces 15A and 16A in which a cross head, generally designated 17, is adapted to reciprocate back and forth. This cross head is a unitary casting having a hollow rear end portion 18 and a ram end 19. As the cross head moves back and forth the ram end 19 is adapted to be projected from the position shown in FIGURE 5 outwardly to an extended position such as that illustrated in FIGURES 13, 15, 19, 21, etc. The ram, during its course of reciprocating movement, is guided sturdily against any deviation from a rectilinear movement by the machine surfaces at 15B and 16B on the main casting, and by a cover plate generally designated 20 which has machine surfaces at 20a and 20b that engage corresponding machine surfaces on the side parts of the ram cross head. Across the rear end of the main casting, there is a cylinder head casting 21 which is attached to the main frame casting by having through bolts 22—22. This cylinder head is machined to receive a cylinder tube 24 of heavy section, and at the opposite end of this tube there is provided a cylinder head 25. The two cylinder heads and tube 24 are held together by long studs 26 and heavy nuts at the end of each stud. The complete cylinder is accordingly disposed in the hollow space 18 of the ram. In the ram adjacent the hollow space a slot 28 is provided for passing one of the hydraulic lines of the cylinder therethrough. Within the cylinder there is a piston 29 on the piston rod 30. The piston rod extends forwardly toward the ram so as to be attached thereto by the internal stud 31. The internal stud extends entirely through the ram and is held in place by the collar nut 32. The collar nut 32 is provided with a sound outer end at 34 for centering the appropriately shaped pressing devices on the ram, said devices being mounted on the ram during various steps of the disassembly and assembly operations.

The main casting 10 extends forwardly beyond the ram through the area 35 and is provided with a horizontal bolting surface 36, terminating at a shoulder 37. Into the corner formed by the surfaces 36 and 37, and mounted upon the surface 36 there is provided an anvil 38. The anvil is situated such that its rear surface faces the surface 37, the latter surface absorbing the pressing force exerted on the anvil. The anvil, which is positioned so as to occupy, approximately, the space between the side pieces of the chain, is held down by bolts 39—39.

The main casting extends beyond the position of the anvil 38 and thence upwardly to form an end stop 40. The end stop provides a vertical bolting surface 41 for receiving the various stops which are applied to the mechanism for carrying out the assembly operation. The casting also provides abutments 42 so as to stiffen the stop 40. Referring to FIGURE 7 particularly, it will be observed that the anvil 38 is provided with a notch 38A and another notch 38B, said notches being spaced apart so as readily to receive the cross members of the chain which is being worked upon. Since chains of different pitch may be handled by the equipment, a suitable number of anvils 38 are supplied wherein the spacing between the notches 38 are appropriate to the pitch of the chain being handled.

Referring to FIGURES 1 and 2, particularly, rearwardly from the press main frame 10 there is provided a conveyor generally designated 44, having a long section 45, only the end portion of which is illustrated. The section 45 is provided with a plurality of rollers 46 of suitable width, for handling the chain that is being worked on. A rope or cable 47 is secured to the far end of the chain being worked on and is brought under the chain and thence over the pulleys 48 and 49 to the winch mechanism 50. The winch mechanism is contained within the framework 51 which supports the delivery end of the conveyor. The table is provided with an upper slide surface 52 composed of spaced members 52A and 52B, see FIGURE 15, having a delivery end shaped at 54 and 55, so as to reach around the anvil 38 in the work area of the press. At one side of the member 54 there is an upstanding guide 56 which serves to maintain the chain along a prescribed path. The slide surfaces 52 are pivoted onto the framework 51 by means of the bolt 58, see FIGURE 2, so that the slide may be elevated at the delivery end adjacent the work surface of the press, as needed in the operation. FIGURE 7 illustrates the slide surface 52—54—55 in a horizontal position, but in dotted lines it shows the same surfaces elevated. A cross frame member at 58a, adjacent the press portion of the apparatus, has pivotally attached to it the clevis end 60 which is mounted on the end of piston rod 61 of hydraulic cylinder 62. The lower end of the cylinder is pivotally attached at 63 to a bracket 64 on the framework 51. When the hydraulic cylinder 62 is operated in one direction, the piston 61 is pushed upwardly, thereby raising the slide end 52—54—55 of the conveyor upwardly to the dotted line position as shown in FIGURE 7 and when the cylinder 62 is operated so as to retract the piston rod 61, the slide 52—54—55 is retracted to the horizontal position. When in the upper position, the chain, laying along the conveyor 45, and stretching outwardly along the slide 52—54—55, as shown in FIGURE 2, is free to be moved along the conveyor end slide, without interference of the cross sleeve of the links with the anvil 38; but when the slide 52—54—55 is lowered to the position shown in FIGURE 7, the sleeves of the links of the chain repose in the notches 38A—38B of the anvil 38.

Provision is made for moving the chains along link by link in either direction, by hydraulic force appropriately applied. This is accomplished by providing on the underside of the slide 52—52, a pair of oppositely disposed gibs 65—65 which are composed of machined bars spaced downwardly under the surfaces of the plates 52—52 by means of the spacer 66 held in place by the bolt 67 (see particularly FIGURES 7 and 8). There are accordingly formed gib spaces 70—70. In the gib spaces there is adapted to slide a framework generally designated 71 composed of opposite side plates 72—72 each of which has an outwardly turned flange 74 at its upper end disposed in the gib spaces 70—70. The plates 72 are held parallel and in appropriate spaced relation by a crossbar 75 held in place by the bolt 76, and by bolts 77—77 having tubular spaces of appropriate length between them. The plates 72—72 have a vertical machined slot at 72A—72B in which a vertically reciprocable member 78 is adapted to move. This member has an upper tongue 78A that is adapted to be moved upwardly to a position so as to engage the sleeves of the chain, or to be retracted downwardly sufficiently so as to be clear of the outermost portion of the sleeve.

For reciprocating the frame 71 backwardly and forwardly in the gib spaces 70, there is provided a hydraulic cylinder 80 pivotally attached at 82 to the framework 51, said cylinder having a piston rod 83 attached to the cross frame member 75 of the frame 71. The cylinder 80, which is of the two-way actuating type, can be projected to the right or to the left any desired amount within its range of movement and in so projecting, it moves the framework 71, and all mechanisms mounted thereon to the right, which is the advancing direction as shown in FIGURES 1, 2, and 7, or to the left which is the retracting direction in these figures. The vertically reciprocable member 78 having an upper end 78A that engages the sleeves of the chain, is adapted to be moved up or down by a cylinder 85. The cylinder 85 has its upper end pivotally attached to the pin 86, and has a piston 87 pivotally attached at 88 to a side arm 89 on the lower end of the reciprocable member 78. This cylinder is also of the two-way actuating type and its limits of movement are such as to permit the upper end 78A to be moved high enough to engage the sleeve of the chain, and low enough so as to be entirely free of the sleeve in the chain. This member 78 is of a width such that it easily clears the space 90 between the two plates 52—52 which form the elevating and slide surface of conveyor table. Accordingly, to move the chain to the right as shown in FIGURES 2 and 7, the vertically reciprocable member 78 is lowered so as to clear the chain and the cylinder 80 is hydraulically actuated so that it moves the framework 71 and hence the member 78 to the left as shown in FIGURE 7. Then when it is desired to advance the chain, the cylinder 85 is actuated so as to project upwardly the member 78. This brings the tip 78A high enough to engage a phase of the chain. Then the cylinder 80 is actuated so as to move the framework and hence the member 78—78A to the right as shown in FIGURE 7, whereupon the tip 78A engages the sleeve of one link and drags the chain along the slide surface 52—52 and along the roller conveyor table 45. An adjustable stop composed of two plates 91 held together by bolts 92 serve to limit the movement of the member 78A to the right as shown in FIGURES 1 and 7. Another adjustable stop 91A serves to limit movement of member 78A to the left in FIGURES 1 and 7. Each stop may be adjusted to accommodate links of different lengths and to bring the chain accurately to position, so as to drop it into the anvil 38 when table 44—54—55 is lowered. The cover plate over the slot 90 held in place by the bolts 95 serves to keep it from falling into the actuating mechanism. Since the spaces between the sleeves of a chain link present a relatively wide dimension, the position of the stop 91A against which the tip 78A abuts on its retracting movement is not critical, but the stop 91 is accurately positioned according to the chain being worked upon. The stop 91 is positioned such that as the chain is moved to the right, as shown in FIGURES 1 and 7, the sleeves on the outermost link will fit neatly into the notches 38A—38B of the anvil 38 whenever the delivery ends 54—55 of the slide are lowered as previously described.

All operations of the press and chain handling conveyor mechanisms are accomplished by four hydraulic cylinders as follows:

The disassembly and assembly operations of the chain are accomplished by the main press cylinder 24, piston 30, and ram 19 actuated thereby. This is an exceedingly heavy hydraulic press cylinder usually capable of exerting from 20 to 125 tons.

The conveyor and chain indexing motions are accomplished by the cylinder 62, which raises and lowers the delivery ends 52—54—55 of the slide on the conveyor; the chain is indexed back and forth, one link at a time, by the combined actuation of the traverse cylinder 80, and the vertically reciprocable cylinder 85. The controls and hydraulic circuits of these cylinders are illustrated in FIGURES 9 and 9a–9f. It may be noted that the ancillary FIGURES 9a–9f are provided to illustrate the operations of the various portions of the valves and regulators, etc. of the hydraulic circuits. The hydraulic circuits provide a low pressure supply for operating the cylinders 62, 80, and 85, and for operating the ram cylinder 24 during the approach and retracting motions, but not during the actual pressing operation. To this end there are provided the following instrumentalities. At 94 is an electric motor which through the V-belts 95 drives a common shaft 96 of a high pressure pump 98 and a low pressure pump 99. Each of these pumps has its input connected to the supply circuit 100 which extends through a cylinder 101 to a common reservoir 102. The output of the low pressure pump is delivered by a line 103 to the inlet 1 of the main control valve 105. This control valve has an operating stem 106 connected through a linkage 107 to a bell crank lever 108 pivoted to the frame at 109. The lever 108 is arranged so that it can be moved in the direction of arrow 110, to cause the press main cylinder 24—30 to move in the corresponding direction as during a pressing operation, and when the lever is moved in the opposite direction 111, the piston 30 is likewise retracted in the opposite direction. Accordingly, when the operator moves the lever 108, he obtains an actuation of the cylinder 24—30 that causes the ram 19 to move in the same direction that said lever 108 is moved through. This is a convenient aid to memory for the operator.

Upon valve 105 there is another control element 112 connected by the link 113 to a bell crank lever 114. The bell crank lever is mounted to move in a direction such that the upper end of lever 114 moves in a plane parallel to the axis of the conveyor 45 and slide 52—54—55. The lever 114 when moved in the direction of arrow 115 (see FIGURE 1) will cause the actuation of the indexing mechanism (cylinders 80—85) to accomplish a movement of the chain in the retracting direction, which is the direction of arrow 115, but when the lever 114 is moved in the opposite direction as in the direction of arrow 116, the actuation of the cylinders 80 and 85 is such as to move the chain toward the press, i.e. in the same direction as arrow 116. Here again, the lever is connected so that the indexing movement of the chain along the conveyor and the slide is in the direction the lever is pushed, and this also is a convenient aid to memory for the operator.

On the main valve 105 there is a third operating element 117. The operating element 117 is connected through the link 118 to a pivot 119 on the lever 120. The lever 120 is pivoted at 121 on the main frame. This lever is so situated that it can be moved upwardly as shown by the arrow 122, FIGURE 9, and in so doing, cylinder 62 is actuated to raise the delivery end 54—55 of the conveyor-slide arrangement along which the chain is moved. When the lever 120 is moved downwardly as shown by the arrow 123, FIGURE 9, the cylinder 62 is actuated so as to lower the delivery end of the slide to the position shown in full lines in FIGURES 2 and 7. This is a further aid to memory for the operator.

The main control valve 105 has a port 2 that is connected by the line 124 to a delivery port 125, which is connected by the jumper 126 to the port 127 and thence by a line 128 through junction 129 and through junction 130 to the reservoir 102.

The main valve 105 has a port 3 connected by a line 131 through junction 132 and junction 133 to port 134 on the high pressure unloading valve generally designated 135. This valve is illustrated in FIGURES 9j and 9k. The high pressure unloading valve has a port 136 on the high pressure line connected to the junction 137 and thence through a high pressure release valve 138 and by a line 139 to junction 140 and thence by a line 141 to junction 130 which is connected to the reservoir 102.

The valve 138 is spring-loaded and permits high pressure oil to be by-passed from junction 137 thence through the valve 138 and line 139, junction 140 and line 141, junction 130 to reservoir 102, when a certain high pressure is exceeded in the line at junction 130. On the valve 135 there is another port 142 connected by a line 144 to junction 145 on the line 146 which in turn connects to junction 140 on the return line to reservoir 102. Line 146 also extends to port 147 on the low pressure unloading valve 148 which has a port 149 connected by a line 150 to the junction 133. The valve 148 has a further port 151 connected by a line 152 to the junction 137 on the high pressure system. The operation of the valve 148 is illustrated in FIGURES 9l and 9m. From junction 137 on the high pressure system a circuit extends at 153 to the junction 154 and thence by a line 155 to the connection 156 which is the inlet to the main press cylinder 24—25—26 (see FIGURE 5). Also connected to this inlet at 157 is a pilot operated check valve 158, having a check 159 therein operated by a pilot piston 160 from the pilot cylinder 161. The pilot cylinder 161 is connected by a port 162 to a line 163 to junction 164 on a line 165 which connects to the piston rod end of the main press cylinder 24—25—26. The operation of the valve 158 is illustrated in FIGURES 9g, 9h, and 9i, and will be subsequently described. From the junction 164, the line 166 extends back to the port 4 on the main control valve 105.

From the port 5 on the main control valve 105, a line 168 extends through junction 169 and connection 170 thence through flexible hose 171 to the inlet 172 on the cylinder 80. From the port 6 on the valve 105 a line 174 extends through the junction 175 and through a sequence valve 176, next through the connection 177 and thence through flexible line 178 to the connection 179 on the opposite end of the traverse cylinder 80. The sequence valve 176 operates the same in both directions. It is set to close and hence prevent passage of hydraulic fluid from junction 175 to connection 177 when the pressure is below a prescribed limit as for example 300 pounds per square inch and then to open when the pressure is above the prescribed limit.

From the port 7 on the valve 105, a line extends at 180 to the connector 181 and thence by way of a flexible hose to the inlet to one port 182 on the cylinder 62, and from the connection 184 on the opposite end of the same cylinder, a flexible hose 185 connects through the junction 186 and then through line 187 to the reservoir 102.

From port 8 on the valve 105, a line extends at 188 to junction 129 on the line 128. At 190 there is provided a sequence valve having a port 191 connected to line 192 to junction 169; a port 194 connected by a line 195 to the junction 175; a port 196 connected by a line 197 to the connection 198 and thence via flexible tube 199 to the connection 200 on one end of cylinder 85. On the opposite end of the cylinder at connection 201, a hose 202 connects through the coupling 204 and thence by a line 205 to the port 206 on the valve 190. The valve 190 which has two positions of operation as indicated in FIGURES 9n and 9p has an operating shaft 207 connected to the handle 208. When the handle 208 is turned in the direction of arrow 209, the uppermost part 78A of the indexer will be retracted downwardly from the chain by the actuation of the cylinder 85 and the cylinder 80 moves the indexer 70 away from the press. Next the indexer 78A will be projected upwardly so as to engage the sleeves of the chain links when the cylinder 80 moves the indexer 70 towards the press. By operating the handle 108 in the opposite direction to 110, the action is just reversed, the indexer 78A is elevated to engage the sleeves of the chain when the cylinder 80 moves the indexer away from the press and the indexer 78A is retracted on the back stroke towards the press. The indexer handle 208 is accordingly set in one position or the other as desired, so that by moving the indexer lever 114 backward and forward, the chain will be moved away from the press one link at a time or moved toward the press one link at a time.

Referring to FIGURES 9 and 9a through 9f, it may be stated that each of the operating plungers 106, 112, and 117 has three positions, as follows: a "Neutral" position as shown for all of the plungers in FIGURE 9, an "In" position which denotes that the plunger is pushed down as shown in FIGURES 9a, 9c, and 9e; and an "Out" position which denotes that the plunger is elevated or pulled out as shown for certain of the plungers in FIGURES 9a–9f. A movement of these plungers by means of their levers 108, 114, and 120, has already been described.

In FIGURES 9a–9f, immediately above valve structure 105 there are shown three horizontal parallel dotted lines. The uppermost of these lines denotes the position to which any of the plungers 106, 112, and 117 may be elevated (pulled out) for an actuation to the "Out" position. The middle dotted line denotes the "Neutral" position in which all hydraulic circuits are disconnected, as shown in FIGURE 9. The lower dotted line denotes the "In" position.

Referring to FIGURE 9, the illustration of the main control valve 105 shows that valve with all of its operating plungers in "Neutral" condition, and in this position, the passages between all of the ports 1–8, or between any of them, are blocked. In FIGURE 9a the plunger 106 is moved to the "In" condition and in this condition, a passage is opened between ports 1 and 4 and another passage is opened between ports 3 and 8. When this is accomplished, the main hydraulic press cylinder 24 is moved to the "In" or "Retracting" condition. In FIGURE 9b the reverse situation is illustrated and plunger 106 is moved to the "Out" condition. In this condition a passage is opened between ports 1 and 3 and another passage is opened between ports 4 and 8 (this is just the reverse of other conditions in FIGURE 9a). When this occurs, the main hydraulic press cylinder 24 is actuated to the "Out" or "Pressing" condition. In both of these Figures, plungers 112 and 117 remain in the neutral condition.

In FIGURES 9c and 9d, the operation of plunger 112 is illustrated, the plungers 106 and 117 meanwhile remaining in the neutral condition. When the plunger 112 is moved to the "In" condition, a passage is opened between ports 1 and 6 and another passage is opened between ports 5 and 8, and when the plunger 112 is moved to the "Out" condition, the passages are reversed, that is to say that the passage between ports 1 and 5 and another passage between ports 6 and 8 are opened.

With the connection of the valves as shown in FIGURE 9c, the combined action of cylinders 80—85 will be effective to move the chain engaging members 78—78A through one stroke away from the press area. When the valves are moved to the condition shown in FIGURE 9d, the effect is to move the member 78—78A toward the press area one stroke, for advancing the chain, as during the assembling operation. Whereas, when the valves are set as shown in FIGURE 9b, a reverse action takes place. In FIGURE 9e the plunger 117 is moved to the "In" condition and plungers 106 and 112 remain in the neutral condition, and as a consequence a circuit is established between port 1 and 2 and another circuit is established between port 7 and port 8. In FIGURE 9f, the plungers 106 and 112 are in the neutral condition and the plunger 117 is moved to the "Out" condition, and as a consequence a circuit is established between port 1 and port 7.

With the operating levers in "Neutral" condition, low pressure oil from the pump 99 circulates through control valve 105 from port 1 to port 2, thence through line 124 to terminal 125, thence through junction 126 to terminal 127 and thence by a line 128, through junction 129 and junction 130 to reservoir 102. If it is desired to use hydraulic pressure for some ancillary purpose, as for example, for operating a hydraulic wrench or hydraulic winch, the junction 126 is removed and the connections to and from such ancillary device are made at the terminals 125 and 127. With the operating levers still in "Neutral" condition, high pressure oil from pump 98 circulates from reservoir 102 through filter 101, line 100, through the pump 98 thence through line 98A to junction 154, line 153 to junction 137 to port 136 on the high pressure unloading valve 135. At this time, low hydraulic pressure is not applied to the terminal 134 of valve 135, and as a consequence, the valve 135 under this condition establishes an open passageway from the port 136 to the port 142. Accordingly, under the conditions aforesaid, circulation goes from the inlet 136 to the outlet 142, thence via line 144, junction 145, line 146, junction 140, line 141, and junction 130, to the reservoir 102.

To move the press cylinder "Out" from the retracted condition as shown in many of the views in the drawings, as for example, in FIGURES 5 and 14, to the "pressing" condition as shown, for example, in FIGURES 13, 15, and many others of the views, the "press lever" has moved in the direction of the arrow 110 so that the piston 30 and ram 19 will move to the left as shown in FIGURE 9 when the cylinder is operated. The initial movement of the cylinder and the ram is accomplished at low pressure with a relatively high volume of hydraulic fluid so as to increase the speed of operation, and it is only when the ram meets resistance of the work that the hydraulic circuits change over automatically from the low pressure to a high pressure for exerting the extremely heavy forces needed for accomplishing the pressing operations intended. Thus, low pressure oil from pump 99 via line 103 flows through the main control valve 105, which is then in the condition shown in FIGURE 9b, that is to say from port 1 to port 3, and thence via line 132A through the pilot operated check valve 158; the operating conditions of said check valve being illustrated in FIGURES 9g, 9h, and 9i. At this time, low pressure oil is also admitted by a line 131 through junction 132 and junction 133 to port 134 of the high pressure unloading valve and also by a line 150 to port 149 of the low pressure unloading valve 148. The effect of low pressure exerted on port 144 causes the valve 135 to move to the condition shown in FIGURE 9k which accordingly blocks off the passage from ports 136 and 142, thereby blocking the free flow return passage of high pressure oil through the valve 148 to the reservoir via lines 144, 145, and 141. As a result the high pressure oil from pump 98 is forced to flow by a line 98A, junction 154, line 155, to port 156 and hence to the press cylinder 24. Oil from the ram end of press cylinder 24 flows by a line 165 by a junction 164, line 166 to port 4 of valve 105, thence through the valve to port 8 and by a line 188 to junction 129, junction 130 to reservoir 102. The flow from the high pressure pump 98 through line 98A to junction 154 hence to the cylinder 24 does not at this time produce a high pressure, since the ram has not yet encountered the resistance. Accordingly, the pressure exerted by a line 153, junction 137, and a line 152 on port 151 of the low pressure unloading valve 148 causes this valve to close off the passage between its ports 149 and 147, as shown in FIGURE 9m, and therefore, the flow of low pressure oil from junction 133 by a line 150 to port 149 is closed off and no flow occurs to the port 147 and back to reservoir, but later on, when the ram encounters pressure the pressure to junction 137 will increase. When the pressure increases to a predetermined amount, as for example, 1200 pounds per square inch, the valve 148 is moved to the right, FIGURE 9, thus opening a passage between ports 149 and 147. The low pressure system is thereby relieved and the pressure in the said system then reduced to approximately 100 pounds per square inch. The high pressure oil continues to move the press cylinder from right to left as shown in FIGURE 9, the operation of the ram at low pressure and high speed is actually accomplished by the inflow of oil via the low pressure and high pressure systems, as shown by the condition of valve 158 in FIGURE 9h. Under these conditions, a flow is established from line 132A to port 158A and thence through the valve 158 and into the right end of the cylinder 124. When the ram encounters resistance, the pressure within the cylinder will increase to 1200 pounds per square inch but this pressure can not back up into this line because of an internal check valve 159 which acts as a check valve so long as there is no pressure on line 163. The high pressure then continues and operates the ram during its working stroke. This condition is represented in FIGURE 9i. In order to return the press cylinder to its retracted condition, the press lever 108 is moved to the right as shown in FIGURE 9, thereby, establishing the conditions for valve 105, as shown in FIGURE 9a. When this occurs, the low pressure which had been exerted by a port 3, junction 132 and junction 133 on the port 134 of high pressure unloading valve 135, will move this valve so as to establish the conditions shown in FIGURE 9j, and hence high pressure oil at junction 137 is again free to flow from port 136 to port 142, line 144, junction 145, line 146, junction 140, line 141, junction 130, and back to reservoir 102. Low pressure oil from pump 99 flows to valve 105 and thence, as shown in FIGURE 9a, from port 1 to port 4, and on to line 166, junction 164 and line 165, and into the ram end of cylinder 24, thereby causing the piston 30 and ram 19 to be moved to the right as shown in FIGURE 9. The low pressure oil is, at this time, also exerted from junction 164, line 163, against the port 162 of the pilot operated check valve 158, thereby establishing in it, the condition of flow illustrated in FIGURE 9g, and thus allows oil from the cylinder head end of the cylinder 24 to return via port 156 and line 155, junction 154, junction 137, port 136, port 142, line 144, junction 145, line 146, junction 140, line 141, junction 130 to the reservoir 102. Also from the valve 158, there is another circuit through the then open check valve 159 in the valve 158 to the port 158A and via line 132A to junction 132 to port 3 of valve 105 and then, port 8, line 188, junction 129, junction 130, to reservoir 102.

The movement of the chain on table 44-conveyor 45, is accomplished by moving the "indexer" lever 114 backwardly and forwardly, and this accomplishes either the advancing of the chain toward the press (during the disassembly of the chain), or the retraction of the chain away from the press (during assembly of the chain) depending upon the setting of the index or reversing lever 208 and its valve 190. There is one movement of the chain for each oscillation of the lever 114 and the lever 208 is established in one position or the other depending upon whether the chain is to be advanced or retracted.

To move the chain toward the press, the index or reversing lever 208 is pulled forwardly, and left in this position, where it stays, due to the fact that it has no bias. The press lever 108 is left in the neutral position and the elevating lever 120 is left in the neutral position. Then the lever 114 is oscillated back and forth, alternately establishing the conditions for valve 105 as shown in FIGURES 9c and 9d. When the lever 208 is in the "forward" condition, (which has the effect of advancing the chain along the conveyor and table towards the press) the valve 190 is positioned as shown in FIGURE 9n thereby establishing communication between ports 194 and 196, and establishing communication between ports 191 and 206. When the valve 208 is moved rearwardly of the press, which is away from the press along the conveyor 45, the valve 190 is moved to the position shown in FIGURE 9p, thereby just reversing the conditions shown in FIGURE 9n. In FIGURE 9p, connections are established from port 196 to port 191 and another connection is established from port 191 to port 206. It is assumed that the piston 83 is retracted, for in the position shown in FIGURE 7 and that the vertical slider 78—78A is in the lower or dotted line position shown in FIGURE 7. It is also assumed that the index or reversing lever 208 and valve 190 are moved to the "forward" condition shown in FIGURE 9n and that the indexer lever 114 and plunger 112 are in the "Neutral" condition. The objective is to move the chain one link toward the ram area of the press, during the disassembly of the chain. The indexer lever 114 is moved and, as previously explained, it swings in a plane parallel to the links of the conveyor and table 44—45, to move the chain toward the press, that is, the lever 114 is moved toward the operator and hence in a direction along the conveyor toward the press. In so doing, the plunger 112 is moved to the "In" condition as shown in FIGURE 9c. Low pressure oil from the pump 99 then flows from pipe 103 to port 1 and thence through the valve 105 to the port 6 and by a line 174, junction 175, and thence against the valve 176. The valve 176 is spring loaded so as to remain closed against flow in either direction when the pressure in either direction against it is below about 300 pounds per square inch and it opens wide above that pressure. Accordingly, when the pressure is thus exerted at junction 175, valve 176 remains closed and pressure is exerted by a line from junction 175 through a line 195 to port 194 and thence through valve 190, which is then in the position shown in FIGURE 9n to port 196, line 197, coupling 198, flexible hose 199, to port 200 on cylinder 85, thereby causing the piston 87 in said cylinder to be elevated, and accordingly raising the slide 78—78A rapidly upwardly. This raises the end 78A from a retracting condition to a condition high enough so that it will, when translated horizontally, engage the sleeves of a chain on the table 44. As the piston 87 is moved to the full line position shown in FIGURE 7, it reaches the end of its stroke, and therefore the pressure in the lines which have been serving it, and hence on junction 175 will rapidly increase; the valve 176 therefore opens and the flow at the higher pressure then continues through coupling 177, hose 178, to cylinder 80, and causes the piston 83 to move rapidly to the right as shown in FIGURE 7 (to the left as shown in FIGURE 9). In so doing, the tip end 78A engages the sleeve of the chain link and moves the chain until the slide 78—78A engages the stop 91, which is set accurately so as to position the most advanced link of the chain so that it will seat neatly into the semi-circular recesses 38A—38B of the anvil 38, see FIGURE 7. It may be noted parenthetically that at this time the slide table 44 is in the "elevated" condition, as shown in dotted lines in FIGURE 7, and the sleeves of the chain links do not hit against the anvil 38. Later on, the slide table 44 is allowed to recede to the full line position shown in FIGURE 7, thereby, bringing the sleeve neatly into the notches in the anvil 38.

The operator then moves the lever 114 "away" from the press, and this is then the retracting stroke. When this occurs, the plunger 102, of course, passes through the neutral condition, thereby stabilizing the lines. The movement of the plunger 112 to the "Out" condition as shown in FIGURE 9d causes pressure to be delivered from port 1 to port 5 of valve 105 and thence by a line 168, junction 169 to coupling 170, flexible hose 171, to port 172 of cylinder 80. The piston would move except for the fact that the return oil from port 179 via hose 178, coupling 177 must pass through the valve 176, which at this time is closed due to the lower pressure in the line at this time. Accordingly, from junction 169 flow is established by a line 192 to port 191 of valve 190 and thence to port 206 of the same valve and by a line 205, coupling 204, line 202 to port 201 of cylinder 85 thereby causing the piston 87 to be moved from the full line to the dotted line position as shown in FIGURE 7, accordingly rapidly lowering the slider 78, so as to withdraw its upper tip 78A from a position where it engages the sleeves, to a position beneath the slide table 44, and hence out of engagement with the sleeves of the chain on the table. When the piston 87 in the cylinder 85 has completed its stroke, the pressure then builds up and valve 176 opens and flow is then accomplished through the line 171 to port 172 thereby actuating piston 83 so as to retract it into its cylinder and back to the position shown in FIGURE 7. This completes the cycle and the operator is then ready to again move the lever 114 forwardly to advance the chain to the distance of another link.

In order to raise and lower the slide table 44, it is only necessary to admit or relieve oil pressure on the piston 62. This is accomplished by moving the elevating lever 120 up in the direction of arrow 122 or down in the direction of arrow 123 thereby moving the plunger 117 correspondingly. When the plunger 117 is moved to the "Out" (elevating) condition, a passage is opened from port 1 to port 7 of valve 105 and accordingly low pressure oil flows from pump 99 to valve 105 and from port 7 thereof by a line 180 to the port 182 of the cylinder 62 thereby raising the piston 61 in that cylinder, to accomplish the elevation of that part of the slide table 44, which is most adjacent to the press. The oil above the piston in cylinder 62 flows out of port 184 via line 185, coupling 186, line 187, to reservoir 102. To lower the table, it is only necessary to push down on the lever 120 thereby moving the plunger 117 to the condition shown in FIGURE 9e, and flow from the pump then passes from pump to port 1 of valve 105 thence to port 2, and via line 124, terminal 125, junction 126, terminal 127, junction 129, junction 130, and back to reservoir 102. Meanwhile, valve 105 has established a connection between ports 7 and 8 and oil can accordingly flow from port 182 of cylinder 62 via coupling 181 and line 180 to port 7 of valve 105 thence to port 8 and via line 188 to junction 129, junction 130 to reservoir. This permits the piston 61 in cylinder 62 to be pushed down, thereby allowing the slide table 44 to move from the dotted line to the full line position as shown in FIGURE 7.

The foregoing hydraulic circuits and facilities accordingly permit rapid actuation of the ram during the free movement of the stroke, and the development of extremely heavy pressures when the ram meets resistance, and permits the advancing or retracting of the chain, one link at a time, as desired. The invention contemplates the use of a less elaborate hydraulic system, but it may be noted parenthetically that the one specifically illustrated, which is exemplary of the invention, gives excellent results in service.

The ram 19 is initially fitted with a suitable pad for engaging the track pins and sleeves, and the shape of this depends on whether the track is to be disassembled, as during a track repairing operation, and then reassembled, or whether the press is used in a factory operation where the parts are initially disassembled and are being assembled additionally.

During the disassembly operation, the ram 19 is provided with a ram head pad, generally designated as 220, which is made up of a block 221 having a vertical cross-section the same size and shape as the ram 19, a small cylindrical forcing pin 222 and a large cylindrical forcing pin 223 (see FIGURE 12). The aforementioned forcing pins are located on the opposite vertical face of the block 220 from the ram head 19 and are spaced such that the large vertical pin 223 will project into the sleeve apertures of a side piece when said sleeve is located in the notch 38A, and the small forcing pin will project into the pin aperture at the opposite end of the same side piece when the sleeve in which said pin is inserted is located in notch 38b.

The ram 19 has a vertically extending key 224 that fits into a groove 225 which is located in the block 221. The block is secured to the ram by a blot 226 and is prevented from rotating or moving out of position when the ram moves the pad to exert a pressure against portions of the link by the combination of the key and the bolt.

Each of the pins 222 and 223 has a beveled end 222A and 223A, said ends being beveled so that the pins will be easily insertable into appropriate apertures even though said apertures may be clogged with rust or dirt. Thus, the pins can be pushed into the respective apertures of the side pieces without moving said side pieces out of position should the respective apertures therein become clogged or bent slightly out of shape.

For assembly operations the ram head pad 220 is removed from the ram head and the ram head assembly fitting 230 (FIGURE 11) is mounted on the ram similarly as the ram head pad 220 was mounted thereon. The ram head assembly fitting is made up of the block 231 which is similar in shape and size to the block 221. The block 231 has a slot 229 therein which fits over the key 224 and an aperture through the central portion thereof wherein the bolt 226 may be inserted to secure the block to the ram head 19. Similarly spaced as the forcing pins 222 and 223 on block 221, there is a large forcing head 233 and a small forcing head 232, said forcing heads being secured to the block 231 by bolts 241 which extend through apertures in peripheral flange portions 243a, 242a of said heads into apertures in the block 231.

The small forcing head 232 is made up of the small annular cylinder 242 having an outer integral peripheral flange 242a at one end thereof. The annular cylinder has an aperture extending longitudinally therethrough which joins a cylindrical recess portion of a larger diameter than said aperture and has a common axis therewith. A shoulder 242b is formed at the intersection of the aperture with the cylindrical recess.

A small holding pin 237 is inserted through the recessed portion so that it will extend through the aperture and beyond the vertical face of the small annular cylinder 242, the holding pin having a collar 237b formed on the ram head end thereof to abut against the shoulder 242b. This prevents the holding pin from being pulled out of the annular cylinder. In back of the holding pin and in the recessed portion, a coil spring 238 is mounted to force the holding pin into engagement with the shoulder 242b, said spring having one end abutting the holding pin and the other end abutting the block. The outer diameter of the small holding pin is approximately the same as the diameter of the forcing pin 222 and its inner diameter is slightly greater than the diameter of a pin of a link. The small holding pin has a beveled forward edge 237a similarly as the portion 222A of the forcing pin. The outer diameter of the small annular cylinder is slightly smaller than a sleeve and the inner diameter is slightly larger than a link pin.

The large forcing head 233 is constructed similarly as the smaller head 232 except that the dimensions of the respective parts thereof are larger. The large forcing head is thus made up of a large annular cylinder 243 having an aperture and a recessed portion therein. A large holding pin 235 is positioned so that its collar 235b abuts the shoulder 243b of said cylinder and a coil spring 239 mounted in said recess. The large holding pin has a beveled edge 235a serving the same purpose as the beveled edge of the forcing pin 223. The outer diameter of the holding pin 235 is slightly smaller than the outer diameter of the sleeve portion of the link. The vertical face of the large annular cylinder is of a similar size and shape as the annular portion of the side link that surrounds the sleeve which is inserted therein. The portion of the respective small and large holding pins extending outwardly beyond the respective annular cylinders is sufficient to hold the side piece in place when said side piece is positioned thereon.

The springs are of sufficient strength such that they cannot be readily pushed inwardly by hand but are resilient enough so that when the link is being assembled, said springs will not interfere with press fitting the side pieces on the pin and sleeve. In other words, the pressure exerted by the springs is relatively small compared to the force exerted by the annular cylinders against appropriate elements of a link.

In addition to fitting the ram head end with the ram head assembly fitting 230 for assembling operation, the end stop 40 is provided with an appropriate back stop fitting 250 (see FIGURE 17). The back stop fitting is of similar shape and structure as that of the ram head pad 220, that is, the back stop fitting is made up of a block 253 which is held in position against the end stop 40 by a bolt 226, a small adaptor pin 251 secured to the back stop such that its longitudinal axis will coincide with the line of the longitudinal axis of the small forcing head 232 and a large adaptor pin 252 secured to the block on the opposite face from the end stop 40 such that its longitudinal axis coincides with the line of the longitudinal axis of the large forcing head 233. The outer diameters of the small and the large adaptor pins are approximately the same as the respective outer diameters of the small and large annular cylinders 242 and 243.

The longitudinal distance between the inner vertical surface of the small adaptor pin and the inner vertical surface of the small annular cylinder when the ram is in press position is substantially equal to the longitudinal length of the pin of the chain to be worked on. That is, the dimensions of the ram head stroke and of the fittings used during assembly are chosen such that when the ram head cylinder is at its outer extended position, the distance between the inner vertical face of the small adaptor head and the inner vertical face of the large adaptor head is such that the side piece FS1 (FIGURE 16) will be properly forced into position on pin P1 at the same time when the opposite end of side piece FS1 is forced into position and the distance between inner vertical face on the large adaptor pin and the inner vertical face of the large forcing head is such that the side piece FS1 will be properly positioned on the sleeve S1.

On the area 35 of the metal casting 10, a combination gauging and supporting mechanism 260 is mounted (see FIGURES 3 and 12). The combination engaging and support mechanism is made up of two small rectangular mounting plates 261 that are spaced apart and bolted to the main casting by bolts 263, two elongated spaced apart parallel slide bars 267 welded at their outer ends to the upper surfaces of said mounting plates, a support plate 264 and a gauge support plate 265, each said plate being slidably mounted on the aforementioned slide bars, and an L-shaped bracket 268 pivotally mounted on the gauge support plate. Since the slide bars are mounted on the upper surface of the mounting plate there is a space between the bottom of the slide bar and the top horizontal surface of the main casting. A slide bolt 269 is passed through an aperture in one corner of the support plate down between the two slide bars and through an aperture in the gib 266 which is located underneath the two slide bars. When the bolt is loosened, the plate is freely slidable along the surface of the slide bars; and when said plate is properly positioned, the bolt is tightened to snug the gib up against the under surface of the slide bars and thus firmly hold the plate in position. The gauge support plate 265 is similarly slidably adjustable as the support plate 264. Thus the plates are positionable for different width links.

The support plate and the gauge support plate are each of a generally rectangular shape having rectangular notches 264a and 265a respectively cut out of the corner portion of said plate so that a portion of each plate extends inwardly toward the ends 55 and 54 respectively to a point midway to the notches 38A of the anvil 38. Thus the plates will provide a flat surface on which a link portion of the track may be rested during the assembly operation of the links having grousers thereon. This operation will be further described hereinafter.

On the ends of the gauge support plates located on the back stop sides of the plate there is an L-shaped bracket 268 which is pivotally mounted to the gauge support plate by a bolt 269. During the disassembly operation the upward extending portion 268a of the L-shaped bracket is pivoted outwardly from the center line passing through the longitudinal length of the table. During the assembly operation of a chain with grousers on, the aforementioned L-shaped bracket is turned so that the upright portion 268a is parallel to and near the aforementioned center line. The bolt and nut pivotally holding the bracket are tightened to hold the bracket in the adjusted position. Then the gauge support plate 265 is adjusted so that the upward extending portion of the support bracket will abut the outer vertical surface of the side piece adjacent the aperture wherein the sleeve is inserted. The purpose of this gauge and support plate mechanism will be desecribed in the description of the method of operation of assembling a track chain with grousers on.

The apparatus for assembling and disassembling the chains of the crawler-type tractor having been described, the method of using said apparatus for assembling and disassembling said chains will be set forth hereinafter. Normally, the chains of a crawler-type tractor have a master pin to hold said chains in place on the tractor track mounting structure. After the master pin has been taken out the track is removed from the tractor. The track now may be disassembled either with grousers left on or with the grousers taken off. The operation and method of disassembly and reassembly for a track with the grousers taken off will be described first.

Normally, the grousers 281 are held in position by four spaced bolts 281A (only two shown) extending through the grouser plates into appropriate apertures 281B in each of the side pieces, there being two bolts extending through each grouser into each side piece under said grousers. Normally, after the tracks have been used for extended periods of time, the ends of the bolts extending through the apertures of the side pieces have been bent or rusted so that it is difficult to remove said bolts, therefore the ends of the bolts are usually burned off.

Where many of the side pieces and/or the grousers are damaged, or if either the side pieces and/or grousers are to be replaced, then all the bolts are removed from the grousers and the grousers are separated from the chain.

If one of the aforementioned conditions does not exist, then usually only the bolts in the side pieces FS are removed. This decreases the time in disassembling and reassembling the chain since only half the number of grouser bolts have to be removed and replaced.

With either the grousers completely removed or with the grouser bolts removed from the side pieces FS, the track is placed on conveyor 45 after the winch rope 49 has been extended to the end thereof.

The winch rope is secured to the far ends of the track from the press and is used to advance the track onto the table to the point where the indexer 78A may engage the first sleeve on the track. The indexer reversing lever 208 is positioned in a forward position such as shown in FIGURE 9n and the index lever 114 is moved in the direction of the arrows 116 to advance the track along the table 44. At the same time that the track is being advanced, the elevating lever 120 is moved in the direction of the arrow 122 to raise the table to the dotted line position shown in FIGURE 2. After the index lever has been depressed a sufficient number of times to advance the foremost side piece of the track to the position shown in FIGURE 2, the elevating lever 120 is moved in the direction of the arrow 123 so that the table will return to the solid line position shown in FIGURE 7. At this time the two foremost sleeves S1 and S2 will fit into the notches 38a and 38b, respectively, of the anvil 38 (see FIGURE 13).

At this point the description will proceed in setting forth the disassembly of a chain which has had the grousers and master pin removed.

Referring to FIGURE 13 the reference numerals used hereinafter to designate the elements of the chain will be set forth. The first link L1 will be considered to be made up of sleeve S1 which is positioned in notch 38A, side piece FS1 which is adjacent a back stop 40, side piece NS1 which is adjacent the ram head, and the pin P1. The ends of the two side pieces opposite the sleeves have apertures therein which tightly fit over the outer ends of pin P1. The second link L2 in the chain is made up of sleeve S2 which has a pin P1 mounted therein, two side pieces FS2 and NS2, each having the forward ends thereof mounted on the ends of sleeve S2 and their outward vertical surfaces being abutted by the inward vertical surfaces of the end portions of the side pieces of the first link, and a pin P2 extending through apertures formed in the far end of the two side pieces. Similarly, the third link L3 is composed of the elements being designated by FS3, NS3, P3 and S3. After the chain is positioned such that sleeves S1 and S2 are held by the notches in the anvil, L1 is partially moved by moving the press lever toward the ram head to actuate said ram head outwardly against the transverse elements of the link. The pressure of the small cylindrical forcing pin 222 against the vertical surface of pin P1 and the pressure of the large cylindrical forcing pin 223 against the sleeve S1 tends to move the whole link in a direction toward the end stop 40, but the side link NS1 is prevented from moving in that direction since it abuts the anvil 38 which prevents movement thereof. It is also to be noted that the side link NS2 is prevented from moving toward the end stop 40, since the sleeve end portion thereof also abuts a portion of the anvil 38.

After the vertical surfaces of the cylindrical portion pins have been brought into engagement with the respective surfaces of the pin P1 and the sleeve S1, the ram head 19 is moved outwardly approximately two inches, this being a sufficient distance to disengage the aforementioned pin and sleeve from their respective fitting in the sleeve S2 and the aperture in link NS1. The side link NS1 having been disengaged, it is normally carried back on the pins of the ram head pad (FIGURE 14) when the ram head 19 is actuated to be retracted by moving the lever 108 in the direction of the arrow 111. At this time the side link NS1 may be manually removed from the ram head pad and placed in a position to be checked to see if repairs are necessary. Also, at this time the subassembly made up of side link FS1, pin P1, and sleeve S1 are in position to be manually removed by sliding the pin P1 out of the sleeve S2, said subassembly to be set aside to be further disassembled in a manner described hereinafter.

After the parts of the link L1 have been removed from the main casting 10, the table is now in the elevated condition and the index lever is rotated in the direction of the arrow 110 so as to advance the second link in position on the ends 54 and 55. Now the elevating lever is depressed so that table is lowered and thus the second link L2 is lowered such that the sleeve S2 fits in the notch 38A and the sleeve S3 fits in the notch 38B. The press lever is again moved in the direction of the arrow 110 to push or separate the side piece NS2 from the pin P2 and the sleeve S2 similarly as shown in FIGURE 14. This separation also moves the pin P2 out of tight engagement with sleeve S3 so that the combination subassembly of the pin P2, the side piece FS2 and the sleeve S2 may be manually removed from the chain as described for the removal of the subassembly of P1, FS1, and S1. The abovementioned steps are repeated until the chain is completely disassembled.

After the chain without grousers has been disassembled, a partial sleeve 275, having an outer diameter and inner diameter of approximately the same dimensions as the sleeves of the chain, is positioned in the notch 38B. A slot 275A is cut in the top portion throughout its length so that the pin P1 may be readily inserted through said slotted portions as shown in FIGURE 15. It is also to be noted that the sleeve has a collar portion 275b formed integral with said sleeve, the width of the collar portion is substantially equal to the width of the ends of the side links that are mounted adjacent the pin ends of the side link FS1 (see FIGURE 15). The collar portion has a larger diameter than the outer diameter of the sleeve so that it will firmly hold the partial sleeve in position in the notch 38B when the ram head exerts a pressure against the pin P1 and thereby transmits pressure through the side piece to the collar portion.

The subassembly of the link FS1, pin P1, and sleeve S1 (as shown in FIGURE 15) is positioned such that sleeve S1 fits in the notch 38A and the pin P1 fits in the slotted portion of the partial sleeve 275, that is, the subassembly is rotated through 180° from the position shown in FIGURE 14. The press lever 208 is then moved toward the anvil so that the small cylindrical forcing pin and the large cylindrical forcing pin will respectively engage the vertical faces of pin P1 and sleeve S1 so as to force said pin and sleeve out of the respective apertures in the side piece. Each subassembly is separated into its respective pins, sleeves, and side pieces as set forth above.

Now all the members of the chain assembly have been disassembled so that they can be readily checked and repaired where necessary. After the aforementioned functions have been performed, the elements of the chain are ready to be reassembled.

For the reassembly operation the ram head pad 220 is removed from the ram head 19 and the ram head assembly fitting 230 is mounted in position in place thereof, said ram head pad having been previously described. At this time the back stop 250 is mounted on the end stop 40 in the manner previously set forth. The partial sleeve or fitting 275 is left in the notch 38b during the reassembling process. The pin P6 is inserted in the slotted portion of the partial sleeve 275 such that one end thereof abuts the small adaptor pin 251, the sleeve S6 is inserted in the slot 38a so that one end of said sleeve abuts the vertical surface of the large adaptor pin 252, and the side piece FS6 is mounted on the ram head assembly fitting such that the sleeve is carried by the fitting 230 whereby the small holding pin 237 extends through the pin aperture of said sleeve and the large holding pin 235 extends through the sleeve aperture of the side piece. The press lever is now moved in the direction of the arrow 110 to actuate the ram so that the side piece FS6 is press fitted on the pin P6 and the sleeve S6. As previously mentioned in the description of the ram head assembly fitting the respective forcing heads are pushed back into the recessed portions against the springs when the ram head continues to move toward the anvil after the vertical surfaces of said forcing heads engaged the vertical surfaces of the pin and sleeve. Thus, as the heads are forced out of the respective apertures the pin and sleeve are press fitted into said apertures. The diameters of the pin and the sleeve are slightly smaller than the diameters of the respective holding pins so that the pin and sleeve may extend a slight distance into the apertures of the force heads. Thus, the annular cylinder will press fit the side piece FS6 such that the outer vertical face thereof is pushed slightly inward of the outer vertical face of the pin P6 and the sleeve S6. When the aforementioned has been accomplished, the forward motion of the ram is stopped and the lever 108 is moved in the opposite direction so as to retract the ram head.

The subassembly of pin P6, side piece FS6, and sleeve S6 having been made, it is then taken out of the anvil and set aside so that another subassembly may be put together in the same manner set forth for assembling the pin P6, side piece FS6, and sleeve S6.

After all the subassemblies have been made, the partial sleeve 275 is removed from the notch 38B and then a subassembly is positioned on the anvil. For sake of clarity of description, the elements of the link have been given different subscripts for the assembly operation than those given to them during disassembly operation.

After the subassembly P6, S6, and FS6 have been assembled as shown in FIGURE 19, the subassembly is rotated 180° such that the side piece FS6 will be abutted by the adaptor pins of the back stop 250. Now a second side piece NS6 is positioned on a ram head assembly fitting 230 similarly a shown in FIGURE 20 and described with relation to assembling the subassembly. This side piece NS6 is press fitted onto the subassembly to complete the first link. For the purposes of description it has been considered that the link L4 and link L5 have been assembled as shown in FIGURE 20. A description of assembly links will precede since the links 4 and 5 have been assembled in a similar fashion. The subassembly FS6, S6, and P6 is positioned by first manually inserting the pin P6 into the sleeve S5. The sleeve S5 with pin P6 therein is returned to the notch 38B, and at the same time the sleeve S6 is positioned in the notch 38A (as shown in FIGURE 20). The side link NS6 is positioned on the ram head assembly fitting holding pins in the manner set forth in the description of making the subassembly. The press lever 108 is moved in the direction of the arrows 110 to actuate the ram 19 so that it will press fit the side piece NS6 on the pin P6 and sleeve S6 in a similar manner as the side piece FS6 was press fitted on the aforementioned element. The elevating lever is now moved in an upwardly direction, arrow 122, so as to actuate the table in an upward direction, thus lifting the sleeve S5 and the sleeve S6 out of the respective notches in the anvil.

At the time of the start of the reassembly, the indexer reversing lever had been moved to the position illustrated in FIGURE 9e. The indexer lever 114 is moved in the direction of the arrow 111 so that the assembled portion of the chain will be moved away from the anvil one chain link. Now the pin of another subassembly is inserted through the sleeve S6. This having been done the elevating lever is again moved in the direction of the arrow 123 so as to lower the table and thus lower the subassembly into the notches so that the next side link NS may be press fitted onto said assembly in the same manner described for the press fitting the link L6. This series of operations continues until the chain has been reassembled.

After the chain has been reassembled the grousers are mounted on the chain assembly by properly positioning them and then inserting the grouser bolts 281A through the apertures 281B in the grousers into the apertures 283 in the side pieces. After the bolts have been inserted, nuts are placed thereon to hold the grousers in position on said chain.

The manner of disassembling and assembling chains with grousers removed therefrom having been described, the manner of assembling and disassembling the chain with the grousers thereon will now be described. The two bolts 281B in each of the grousers connecting said grouser to its respective side pieces are removed. After all the bolts on one side of the chain have been removed, the chain is then ready to be disassembled.

The same attachments that were used for disassembling without grousers thereon are used for disassembling the chain with the grousers on. Also, the chain is indexed into position to be disassembled in a similar fashion as that set forth for moving the chain into position for disassembly with the grousers off; that is, the sleeve of first link and the sleeve of second link are positioned in the respective notches by use of the index lever and the elevating lever. The method of disassembling the chain with the grousers on is the same as that set forth for disassembling with the grousers off as previously described and illustrated in FIGURES 13–15. The main difference in disassembling a track with grousers still attached to the near side pieces (those adjacent the ram) is that, after the pin and sleeve have been pushed out of the near side piece, the latter will not remain on the pressing heads when they are fully retracted to the right. (Compare FIGURE 14, showing this disassembly step with the grousers off.) The reason for this is that one end of each grouser has a downwardly-turned, transverse lip (for example, element 280E in FIGURE 23) that is provided with slots (280G in FIGURE 22) to receive the side pieces of the adjacent link. When the side pieces of two adjacent links are in a straight line (as they are when the end link is positioned in the saddle), the unnotched portions of this lip prevent substantial relative transverse movement between the grouser of the end link and the side pieces of the adjacent link. Accordingly, when the pin and the sleeve have been pushed out of their holes in the near side piece to which a grouser is secured and the press means is retracted, the engagement of the grouser with the adjacent link will pull the side piece off the pressing elements. The near side piece and its grouser are then removed. To do this the table 44 is elevated, the chain is advanced and the loosened side piece NS1 with grousers attached bends down to the position shown in FIGURE 23, thus permitting the unslotted portions of grouser lip 278E to clear the adjacent ends of the side pieces of the next link (L12) and the side piece NS1 with the grouser on it can then be slid sideways, to remove this assembly, which is then set aside to be inspected and to later be reused in reassembly of the chain.

In assembling a chain with a grouser attached to each of the near side pieces, the back stop 250 and the ram head assembly fitting are mounted as previously set forth. The subassemblies are made in the same manner as described for a chain with the grousers removed.

After all the subassemblies have been made, the partial sleeve fitting is removed from the notch 38B. Then the L-shaped bracket 268 on the gauge support plate 265 is pivoted to the position shown in FIGURE 25 in the manner previously set forth in the description of the structure thereof. The L-shaped bracket is pivoted and secured in position so that it will abut the sleeve aperture surface of the side piece when the side piece is properly positioned to be pressed, that is when the vertical faces of the pin and the sleeve are abutted against the adaptor pins on the back stop fitting 250. As previously set forth, the first link assembled is of slightly different structure than the rest of the links, since the first link forms a master link and has an opening therein for the master pin, this structure being conventional and will not be further described.

For the purposes of this description of the reassembly with the grousers on, it will be assumed that a few of the links have been assembled since assembly of a further link will be the same as the assembly of the first mentioned links. Before proceeding further with the description of the assembly of the chain with grousers mounted thereon, the description of the grousers and manner in which it intermeshes with portions of the other grousers on the chain will be set forth so that the problem overcome by the use of this invention will be clearly set forth.

The grousers 280 (see FIGURES 22 and 23) which is generally rectangular in shape in a horizontal plane has a transverse upstanding rib 280D formed integral with the rectangular portion 280C. The upstanding rib is positioned to be located over the pin of the link on which the grouser is mounted. Ahead of the ribs is a downwardly curved portion 280E formed integral with the rectangular portion and the rib portion. The aforementioned downwardly curved portion is curved similarly as the end of the side pieces 287 on which it is mounted but spaced slightly therefrom. The downwardly curved portion extends in a downward direction until its lower edge is substantially in the same horizontal plane as the bottom portion of the upper longitudinal part of the side piece 287.

Formed integral at the opposite end of the rectangular portion of the grouser is an upwardly curved portion 280F which has a similar rate of curvature as the downwardly curved portion. The upwardly curved portion is slightly above the respective downwardly curved portion of the preceding grouser. The two curved portions are necessary so that the chain may be flexed to be rotated around appropriate wheel structure.

The downwardly curved portion 280E has two grouser slots 280G cut therein, said slots being located over the side pieces 287 such that said downwardly curved portion may fit over the upper longitudinal extending portion of the preceding side piece 289. Further, the width of the slot is slightly greater than the width of the respective side piece so that during the process of assembling and disassembling of the grousers from the chain the aftermentioned operations may be facilitated.

As a result of the downwardly curved portion extending down below the upper surface of the preceding side link, the side piece NS11 with the grouser 278 thereon (shown in phantom, FIGURE 25) cannot be mounted on the subassembly in the same fashion that the corresponding side piece was mounted on a subassembly when there were no grousers mounted thereon. This results because in order to position the downwardly curved part under the next preceding grousers the whole downwardly curved portion would have to be slid through a horizontal plane but from observation of FIGURE 23, it can readily be seen that the downwardly curved portion 280E cannot be so slid into place under the upwardly curved portion 281F.

To overcome this problem after a link with a grouser thereon has been completely assembled it is necessary to elevate the table 44 to raise the link out of the anvil, but the index lever is not moved at this time.

Thus in FIGURES 23 and 25 with the table elevated and the link L12 completely assembled, the subassembly P11, FS11, and NS11 are positioned as shown, that is, the pin P11 is inserted through the sleeve S12 and the sleeve end of the side link FS11 is rested on the gauge support plate. It is to be noted that in this position the ends 54 and 55 of the table are in an elevated relationship to the support plate and gauge support plate. As a result the subassembly P11, S11, FS11 forms an obtuse angle with respect to link 12, thus the downward curved portion 278E of link 11 may be extended under the upward curved portion of link 12 above the top horizontal surface of the side piece FS12. As a result of the relation of the aforementioned spaced parts the side piece NS11 with the grousers 278 thereon may be positioned as shown in FIGURES 23 and 25.

After the subassembly pin P11, side link FS11, and sleeve S11 have been connected as shown in FIGURE 23 the end of chain nearest the operator is moved toward the ram head so that the center line of the chain A—A forms an acute angle with the center line B—B to the conveyor belt. The grousers 278 with their attached side piece NS11 are positioned as shown in FIGURE 25 (the grousers 278 being shown in phantom so that the position of the side piece elements may be shown) by sliding the downwardly curved portion 278E between the upwardly curved portion 279F and the side pieces FS12 and NS12. The index lever is now moved away from the operator so that the indexers will move the chain back one link, thereby positioning the elements of link 11 so that the sleeve S12 and the sleeve S11 will be over their respective notches of the anvil. Now the elevating lever is depressed so that the aforementioned sleeves will be properly positioned in the respective notches. This having been done, the elements are ready to be press fitted together such as is shown in FIGURE 22.

As a result of having notched the grouser plate 278 with respect to grouser plate 279, the downward curved portion 278E is properly fitted so that the notch 278G therein will fit over the sleeve end of the side pieces FS12 and NS12 and even though the pin end of the side piece FS11 is located outside of the notch portion 278 it may be readily seen that said end will fit under the downwardly curved portion such that it may be press fitted into position (FIGURE 23).

After having positioned the parts such as shown in FIGURE 22 the press lever 103 is moved in the direction of the arrow 110 thereby actuating the ram head 19. Ram head 19 having been actuated, it will engage the side link NS11 and press fit it over the respective portions of the pin P11 and the sleeve S11 and thus the assembly of link L11 is completed.

Next the elevating lever is raised so as to elevate the ends 54 and 55 similarly to that shown in FIGURE 3. At this time, the chain is positioned so that another subassembly may be fitted and connected thereto, the steps being similar to that set forth for assembling link 11 as above described. After the reassembly of the chain is completed, the remaining grouser bolts are inserted in the appropriate aperture and secured to hold the grousers in place on the chain. Then the chain is ready to be used on a crawler-type tractor.

Referring to FIGURE 22 there is shown a notch 291 formed in a vertical face of the anvil adjacent the notch 38B. The purpose of this notch is to provide sufficient room to allow the sleeve ends of the side link FS12 to be moved toward the ram head in the manner previously set forth when the center line of the chain is moved toward the ram head, and at the same time allow said end to be properly positioned in the notch, that is, the portion of the sleeve end extending below the horizontal surface of the sleeve.

A modified embodiment of this invention as illustrated in FIGURES 28 and 29 has an anvil 301 slidably mounted for vertical movement in the main casting 300. The main casting 301 is shaped similar to the casting 10 previously described except that it has downwardly extending portions forming side walls 303 and end walls 302 of a rectangular chamber. Mounted adjacent the downwardly extending portion 302 is side plate 304 and adjacent the downwardly extending portion 303 is end plate 305, the side plate and end plates being made of heavy steel and form a vertical casing surrounding the anvil for the anvil to slide in. The lower ends of the side plates and portions of the end plates rest on angle irons 320 which are secured to the downward extending walls 302, 303 of the casting by heavy bolts 321. This structure is mounted on the frame 13 similarly as the main casting of the preferred embodiment was mounted.

The anvil 301 has an upper portion 301A shaped similarly as the upper portion of anvil 38, said upper portion 301A having slots 301C and 301D therein. The lower portion 301B of the anvil 301 is rectangular shaped in a horizontal plane and slightly smaller than the openings enclosed by the vertical rectangular plates 304 and 305. Thus the anvil may be moved in the opening formed by said vertical plates but there is relatively close tolerance so that the plates will absorb the pressure exerted against the anvil by the chain that is being disassembled and reassembled and will prevent the anvil from moving out of position when a side force is exerted against it.

The anvil 301 is mounted on a mounting plate 310 which is secured to the bottom surface of the anvil by bolts 311. The mounting plate 310 has an integral projection 310A extending in a downwardly direction in the central portion of said mounting plate. An aperture is located in the lower surface such that a piston rod 319 may be secured therein.

A horizontal bar 316 running parallel to angle irons 13 and below the surface of said iron is fastened to the side walls of the casing. On the flat upper surface of the bar, a cylinder 317 having a flange 317A at the bottom thereof is secured to said horizontal bar by the bolts 318. A piston rod 319 connects the pistons mounted in the cylinder 318 to the aperture formed in the bottom surface of the projection 310A. Hydraulic fluid lines 324 and 325 are connected to the cylinder 317 to actuate the cylinder therein similarly as the hydraulic lines are connected to the piston 62. The actuation of the piston in the cylinder 317 is controlled by an elevating lever and since the operation is the same as used for actuating the piston in the cylinder 62, the control and hydraulic system for the cylinder will not be further described.

As may be noted the upper surfaces of the rectangular plates 305 and 304 are below the lower surfaces of the ends 54, 55 of the table 44. At the same time the lower portion of the anvil extends downwardly a sufficent distance into the chamber formed by said vertical plates such that it is held tightly in place and is kept from rotating when pressure is applied to a portion of said anvil.

With the use of the retractible anvil as shown in the modified embodiment, the hydraulic cylinders, valves, hydraulic supplies and controls of the apparatus are the same as those used in the preferred embodiment except that in place of elevating cylinder 62 there is an elevating cylinder 317. The cylinder 62 and piston rod 61 with its supporting structure are not used for elevating the table; in place thereof, the cylinder 317 and the piston 318A connected to the slidable anvil 301 serve the purpose of providing structure wherein the links may be moved into position over the anvil notches by the indexer. Thus, in the modified embodiment of the invention, the elevating lever will elevate and retract the anvil 301.

The method of assembly and disassembly of the chain with the grousers off is the same as previously described except that instead of using an elevating table to raise the chain links above the anvil 38 such that the sleeve portions thereof may be positioned in the notches 38A and 38B, the anvil 301 is retracted (see FIGURE 29) so that the aforementioned sleeves may be slid over the top of the anvil. When the sleeves are properly positioned over the notches the control lever for the cylinder 317 is raised so that the anvil will be in the position shown in FIGURE 28 to hold the elements of the links similarly as shown in FIGURE 26. The anvil holds the elements of the links in position so that the parts may be press fitted or disassembled in the manner previously described.

The only difference in the mode of operation than that previously set forth is that instead of elevating the table and depressing it, the anvil is retracted and elevated respectively in place thereof.

The preferred embodiment facilitates assembly of the chain with grousers on the side pieces more so than the modified embodiment since as may be readily seen in FIGURE 25 by using the elevating table, the assembled link may be "notched" with respect to the subassembly that is to be fitted therein. With the modified embodiment, this would have to be accomplished manually, otherwise the assembling of the chain with grousers on and disassembling it is performed in the same manner described for the preferred embodiment.

From the foregoing descriptions it may be seen that the apparatus and a method has been set forth to accomplish the stated objective.

As many widely apparent different embodiments of this invention may be made without departing from the spirit and scope thereof, it is to be understood that we do not limit ourselves to the specific embodiments herein.

What is claimed is:

1. A track press for operating on the links, or portions of the links, of a chain wherein each link includes a pair of spaced side pieces connected together by a transverse sleeve press fitted into holes through one end of each side piece and also connected by a transverse pin of greater length than the sleeve press fitted into holes through the other end of each side piece and wherein the links are assembled with the pin of one link passing through the sleeve of an adjacent link to form a chain, said press comprising: a frame, a central abutment having a base and sides and being fixedly mounted on the frame, said sides projecting from and extending transversely of said frame to be interposed between the side pieces of an end link of the chain and to hold the first side piece of the end link against movement in a direction towards one of said sides of said abutment, press means mounted on the frame longitudinally thereof adjacent said one abutment side, a pair of spaced pressing heads mounted on the press means and projecting therefrom longitudinally of said frame towards said one abutment side, the first head being in axial alignment with the pin in the first side piece, and the second head being in axial alignment with the sleeve in the first side piece and projecting beyond the first head a distance approximately equal to one half of the difference in length between the pin and the sleeve, the pressing heads being movable longitudinally of said frame with the press means towards said one abutment side for applying axial pressure simultaneously on the pin and sleeve to force the pin and sleeve axially out of the holes in that side piece, the second side piece of the same link being free to move transversely as a unit with the pressed pin and sleeve in the direction of the pressing movement for a distance at least equal to that necessary to free the pin and sleeve from the holes in the first side piece, and disengaging means for effecting relative vertical movement between the chain and the abutment while moving the chain longitudinally to position a link above the abutment, said disengaging means including a lifting member extending transversely of and overlying said frame adjacent said base and sides of said abutment and adapted to extend longitudinally of and underlying the chain adjacent the abutment, and means for elevating said member above the abutment.

2. A track press for operating on the links, or portions of the links, of a chain wherein each link includes a pair of spaced side pieces connected together by a transverse sleeve press fitted into holes through one end of each side piece and also connected by a transverse pin of greater length than the sleeve press fitted into holes through the other end of each side piece and wherein the links are assembled with the pin of one link passing through the sleeve of an adjacent link to form a chain, said press comprising: a frame, a central abutment having a base and sides and being fixedly mounted on the frame, said sides projecting from and extending transversely of said frame to be interposed between the side pieces of an end link of the chain and to hold the first side piece of the end link against movement in a direction towards one of said sides of said abutment, press means mounted on the frame longitudinally thereof adjacent said one abutment side, a pair of spaced pressing heads mounted on the press means and projecting therefrom longitudinally of said frame towards said one abutment side, the first head being in axial alignment with the pin in the first side piece, and the second head being in axial alignment with the sleeve in the first side piece and projecting beyond the first head, a distance approximately equal to one half of the difference in length between the pin and the sleeve, the pressing heads being movable longitudinally of said frame with the press means towards said one abutment side for applying axial pressure simultaneously on the pin and sleeve to force the pin and sleeve axially out of the holes in that side piece, the second side piece of the same link being free to move transversely as a unit with the pressed pin and sleeve in the direction of the pressing movement for a distance at least equal to that necessary to free the pin and sleeve from the holes in the first side piece, and disengaging means comprising an elongated lifting member extending transversely of and overlying said frame adjacent said base and sides of said abutment and adapted to extend longitudinally of and underlying at least a portion of the chain, said member having a slotted end portion extending on either side of the abutment and underlying the side pieces of a link supported on the abutment, the other end of said member being pivotally secured to the frame at a point remote from the abutment, and means for elevating said member to raise its slotted end and the chain supported thereby above and out of engagement with the abutment.

3. A track press for operating on the links, or portions of the links, of a chain wherein each link includes a pair of spaced side pieces connected together by a transverse sleeve press fitted into holes through one end of each side piece and also connected by a transverse pin of greater length than the sleeve press fitted into holes through the other end of each side piece and wherein the links are assembled with the pin of one link passing through the sleeve of an adjacent link to form a chain, said press comprising: a frame, a central abutment having a base and sides and being mounted on the frame, said sides projecting from and extending transversely of said frame to be interposed between the side pieces of an end link of the chain and to hold the first side piece of the end link against movement in a direction towards one of said sides of said abutment, press means mounted on the frame longitudinally thereof adjacent said one abutment side, a pair of spaced pressing heads mounted on the press means and projecting therefrom longitudinally of said frame towards said one abutment side, the first head being in axial alignment with the pin in the first side piece, and the second head being in axial alignment with the sleeve in the first side piece and projecting beyond the first head a distance approximately equal to one half of the difference in length between the pin and the sleeve, the pressing heads being movable longitudinally of said frame with the press means towards said one abutment side for applying axial pressure simultaneously on the pin and sleeve to force the pin and sleeve axially out of the holes in that side piece, the second side piece of the same link being free to move transversely as a unit with the pressed pin and sleeve in the direction of the pressing movement for a distance at least equal to that necessary to free the pin and sleeve from the holes in the first side piece, the abutment being provided with a pair of longitudinally spaced transverse notches for supporting sleeves of the chain in axial alignment with the pressing heads, and a pin spacer element for use in disassembling a subassembly consisting of the second side piece of an end link and the sleeve and pin attached thereto after the first side piece has been separated therefrom, said spacer element having a sleeve-like body portion with substantially the same interval and external diameters as those of a sleeve of the chain and having at one end a flanged head portion with an axial thickness substantially equal to the thickness of a side piece of the chain in the area of its attachment to the sleeve of an adjacent link, said spacer element being adapted to be inserted in one of the abutment notches normally occupied by the sleeve of an adjacent link with the head of said element projecting beyond and overlapping the side of the notch adjacent the press means and adapted, when so inserted, to receive and support the pin of said subassembly with the side piece thereof positioned on that side of the abutment adjacent the press means to align that pin with the first pressing head and to space the pin end of said side piece from the side of the abutment, the sleeve of said subassembly being adapted to be supported in the other of the abutment notches, whereby the advance of the pressing heads will simultaneously press the pin and sleeve from the side piece of the subassembly.

4. Apparatus according to claim 3, in which the pin spacer element is open at the top for insertion of the pin of the subassembly from above.

5. A track press for operating on the links, or portions of the links, of a chain wherein each link includes a pair of spaced side pieces connected together by a transverse sleeve press-fitted into holes through one end of each side piece and also connected by a transverse pin of greater length than the sleeve press-fitted into holes through the other end of each side piece and wherein the links are assembled with the pin of one link passing through the sleeve of an adjacent link to form a chain, and wherein a grouser of the type described is attached to the first side piece of each link, said press comprising: a frame, a central abutment mounted on the frame to be interposed between the side pieces of an end link of the chain and to hold the first side piece of the end link against transverse movement in a direction towards the second side piece of the same link, press means mounted on the frame adjacent the outer face of the first side piece, a pair of spaced pressing heads mounted on the press means and projecting therefrom towards the first side piece, the first head being in axial alignment with the pin in the first side piece, and the second head being in axial alignment with the sleeve in the first side piece and projecting beyond the first head a distance approximately equal to one half the difference in length between the pin and the sleeve, the pressing heads being movable with the press means towards the outer face of the first side piece for applying axial pressure simultaneously on the pin and sleeve to force the pin and sleeve axially out of the holes in that side piece, the second side piece of the same link being free to move transversely as a unit with the pressed pin and sleeve in the direction of the pressing movement for a distance at least equal to that necessary to free the pin and sleeve from the holes in the first side piece, support means for supporting the partially disassembled end link at a predetermined downwardly open obtuse angle to the adjacent link to provide lateral clearance between the grouser attached to the first side piece of the end link and the side pieces of the adjacent link, and said support means including a lifting member having a flat end portion that normally underlies the end link of the chain and, after the lifting member is elevated and after the advancement of the chain by one link, underlies the adjacent link and permits a partially disassembled end link to overhang its outer end, and means for elevating the lifting member.

6. A track press for operating on the links, or portions of the links, of a chain wherein each link includes a pair of spaced side pieces connected together by a transverse sleeve press fitted into holes through one end of each side piece and also connected by a transverse pin of greater length than the sleeve press fitted into holes through the other end of each side piece and wherein the links are assembled with the pin of one link passing through the sleeve of an adjacent link to form a chain, said press comprising: a frame, a central abutment mounted on the frame and provided with a top and sides, the sides of the abutment projecting from and extending transversely of the frame and adapted to be interposed between the side pieces of an end link and the side pieces of an adjacent link of the chain to hold the first side pieces of each of those links against movement in a direction towards the second side pieces of the same links, the top of the abutment being provided with a pair of longitudinally spaced transverse notches for receiving the sleeve press fitted in the end link and the sleeve press fitted in the adjacent link with portions of the inner surfaces of the first side pieces of each of those links engaging an adjacent first side of the abutment, press means mounted on the frame and movable longitudinally thereof towards the first side of the abutment for applying axial pressure simultaneously on the pin and sleeve press fitted in the first side piece of the end link to force the pin and sleeve axially out of the holes in that side piece, the second side piece of the same link being free to move transversely as a unit subassembly with the pressed pin and sleeve in the direction of the pressing movement for a distance at least equal to that necessary to free the pin and sleeve from the holes in said first side piece, spacing means for use in disassembling said subassembly, said spacing means being adapted to be inserted in the abutment notch previously occupied by the sleeve of said adjacent link and adapted when so inserted to receive and support the pin of the subassembly in alignment with the press means and said spacing means including means adapted to engage the side of the abutment to space the side piece of that subassembly from the first side of the abutment by an amount substantially equal to the thickness of the side piece of the adjacent link, the sleeve of the subassembly being adapted to be supported at the same time in the other of the abutment notches in axial alignment with the press means, whereby the advance of the press means will simultaneously press the pin and sleeve from the side piece of the subassembly.

7. The method of disassembling an end link of a crawler-type tractor chain of the type wherein each link includes a pair of spaced side pieces connected together by a transverse sleeve press-fitted into holes through one end of each side piece and also connected by a transverse pin of greater length than the sleeve press-fitted into holes through the other end of each side piece and wherein the links are assembled with the pin of one link passing through the sleeve of an adjacent link to form a chain, said method comprising the following steps: interposing a fixed abutment between the first and second side pieces of the end link and between the first and second side pieces of the adjacent link of the chain with the inside surfaces of said first side pieces against said abutment to restrain movement of the first side pieces in a direction towards the second side pieces of the same links, simultaneously subjecting the pin and sleeve ends that are press-fitted in the first side piece of the end link to mechanical pressure of at least one thousand pounds in a direction towards the second side piece of that link to press said pin and sleeve and second side piece of said end link simultaneously through equal distances at least equal to that necessary to free the pin and sleeve from the holes in the first side piece thereby to disconnect that side piece from a subassembly consisting of the second side piece of the end link and the pin and sleeve press-fitted therein, freeing said subassembly from the sleeve of the adjacent link, supporting each end of said second side piece in said subassembly with its inside surface against a fixed abutment to restrain movement of said second side piece in a direction towards the free ends of the pin and sleeve press fitted therein and simultaneously subjecting the fixed ends of said pin and sleeve to mechanical pressure of at least one thousand pounds in said last mentioned direction to press the pin and sleeve simultaneously through equal distances at least equal to that necessary to free the pin and sleeve from the holes in said second side piece.

8. The method of completely disassembling a crawler-type tractor chain of the type wherein each link includes a pair of spaced side pieces connected together by a transverse sleeve press-fitted into holes through one end of each side piece and also connected by a transverse pin of greater length than the sleeve press-fitted into holes through the other end of each side piece and wherein the links are assembled with the pin of one link passing through the sleeve of an adjacent link to form a chain, said method comprising the following steps: (a) partially disassembling successive links of the chain by interposing a fixed abutment between the first and second side pieces of an end link and of an adjacent link of the chain with the inside surfaces of said first side pieces against said abutment to restrain movement of the first side pieces of those links in a direction towards the second side pieces of the same links, simultaneously subjecting the pin and sleeve ends that are press-fitted in the first side piece of the end link to mechanical pressure of at least one thousand pounds in a direction towards the second side piece of that link to press said pin and sleeve and second side piece of said end link simultaneously through equal distances at least equal to that necessary to free the pin and sleeve from the holes in the first side piece of the end link thereby to disconnect that side piece from a subassembly consisting of the second side piece of the end link and the pin and sleeve press-fitted therein, completing the disassembly of said subassemblies by successively freeing said subassembly from the sleeve of the adjacent link which then becomes the end link, repeating the foregoing partial disassembly steps for successive end links of the chain; and (b) supporting each end of the side piece of one of said subassemblies with its inside surface against a fixed abutment to restrain movement of the side piece in a direction towards the free ends of the pin and sleeve press-fitted therein and simultaneously subjecting the fixed ends of said pin and sleeve to mechanical pressure of at least one thousand pounds in said last mentioned direction to press the pin and sleeve simultaneously through equal distances at least equal to that necessary to free the pin and sleeve from the holes in said side piece.

9. The method of disassembling a crawler-type tractor chain of the type wherein each link includes a pair of spaced side pieces connected together by a transverse sleeve press-fitted into holes through one end of each side piece and also connected by a transverse pin of greater length than the sleeve press-fitted into holes through the other end of each side piece and wherein the links are assembled with the pin of one link passing through the sleeve of an adjacent link to form a chain, said method comprising the following steps: advancing the chain longitudinally until the end link is located at an index position, holding the first side piece of the end link at the index position against transverse movement in a direction towards the second side piece of the same link while applying a pushing force of at least one thousand pounds in said direction simultaneously to the pin and sleeve ends press-fitted in the first side piece to move said pin and sleeve and second side piece in the direction of the pushing force through the distance necessary to free them from the holes in the first side piece thereby to disconnect that side piece from a subassembly consisting of the second side piece of the end link and the pin and sleeve press-fitted therein, removing said subassembly from the still assembled portion of the chain, advancing the still assembled portion of the chain a distance of one link to position the next assembled link in said index position, repeating the steps of holding and applying a pushing force, removing the subassembly and advancing the still assembled portion of the chain to disassemble a plurality of first side pieces from their respective subassemblies, positioning a subassembly of a second side piece and pin and sleeve in said index position with each of said elements occupying respectively the positions formerly occupied by the first side piece and pin and sleeve of an assembled end link, holding the second side piece in said index position against transverse movement in said previous pushing direction while applying a pushing force of at least one thousand pounds in said direction simultaneously to the pin and sleeve ends press-fitted in the second side piece to move said pin and sleeve in the direction of the pushing force through the distance necessary to free them from the holes in the second side piece, and repeating the steps of holding and applying a pushing force to the remaining subassemblies until at least a portion of the chain is completely disassembled into separate components consisting of side pieces, pins, and sleeves.

10. The method of disassembling a crawler-type tractor chain wherein each link includes a pair of spaced side pieces connected together by a transverse sleeve press-fitted into holes through one end of each side piece and also connected by a transverse pin of greater length than the sleeve press-fitted into holes through the other end of each side piece and wherein the links are assembled with the pin of one link passing through the sleeve of an adjacent link to form a chain and wherein each link is provided with a separate grouser plate which is bolted to the first and second side pieces of the link and has one end that underlies the grouser plate of an adjacent link and is provided with slots for receiving the side pieces of said adjacent link beyond the sleeve of that link, said method comprising the following steps: unbolting the grouser plate from the second side piece only of an end link of the chain, advancing the chain longitudinally until the end link is located at an index position, holding the first side piece of the end link at the index position against transverse movement in a direction towards the second side piece of the same link while mechanically applying a pushing force of at least one thousand pounds in said direction simultaneously to the pin and sleeve ends press-fitted in the first side piece to move said pin and sleeve and second side piece in the direction of the pushing force through the distance necessary to free them from the holes in the first side piece, and rotating the side pieces of the end link about the axis of the pin of the end link relative to the side pieces of the adjacent link to free the grouser plate of the end link from the grouser plate and side pieces of the adjacent link, thereby to disconnect the first side piece of the end link and its attached grouser plate from the assembled portion of the chain and from a subassembly consisting of the second side piece of the end link and the pin and sleeve press-fitted therein.

References Cited in the file of this patent

UNITED STATES PATENTS

| | | |
|---|---|---|
| 1,460,749 | Dull | July 9, 1923 |
| 1,946,911 | Lindberg et al. | Feb. 13, 1934 |
| 2,020,162 | Rogers | Nov. 5, 1935 |
| 2,155,626 | Weiss | Apr. 25, 1939 |
| 2,256,718 | Kreiter | Sept. 23, 1941 |
| 2,268,225 | Rodgers | Dec. 30, 1941 |
| 2,700,870 | Green | Feb. 1, 1955 |
| 2,764,133 | Pegard | Sept. 25, 1956 |
| 2,780,204 | Barley | Feb. 5, 1957 |
| 2,895,289 | Wognum et al. | July 21, 1959 |

FOREIGN PATENTS

| | | |
|---|---|---|
| 275,768 | Great Britain | Aug. 18, 1927 |
| 470,377 | Canada | Dec. 26, 1950 |

OTHER REFERENCES

German printed application, No. H 16, 432 II/63d, printed Dec. 15, 1955.